(12) United States Patent  
Hatasaki et al.

(10) Patent No.: US 8,352,720 B2  
(45) Date of Patent: *Jan. 8, 2013

(54) METHOD FOR CHANGING BOOTING CONFIGURATION AND COMPUTER SYSTEM CAPABLE OF BOOTING OS

(75) Inventors: Keisuke Hatasaki, Kawasaki (JP); Takao Nakajima, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/137,275

(22) Filed: Aug. 3, 2011

(65) Prior Publication Data

US 2011/0296160 A1 Dec. 1, 2011

Related U.S. Application Data

(63) Continuation of application No. 12/232,653, filed on Sep. 22, 2008, now Pat. No. 8,015,396, and a continuation of application No. 11/269,702, filed on Nov. 9, 2005, now Pat. No. 7,444,502.

(30) Foreign Application Priority Data

Sep. 2, 2005 (JP) ................................. 2005-254292

(51) Int. Cl.  
*G06F 9/00* (2006.01)  
*G06F 1/00* (2006.01)  
*G06F 15/16* (2006.01)  
*G06F 15/167* (2006.01)  
*G06F 15/177* (2006.01)  
*G06F 13/00* (2006.01)  
*G06F 12/00* (2006.01)  
*G06F 15/00* (2006.01)  
*G06F 11/00* (2006.01)

(52) U.S. Cl. ............... 713/2; 713/1; 713/100; 713/300; 709/211; 709/216; 709/220; 710/104; 711/114; 712/28; 714/12

(58) Field of Classification Search .................. 713/1, 2, 713/100, 300; 709/211, 216, 220; 710/104; 711/114; 712/28; 714/12  
See application file for complete search history.

(56) References Cited

U.S. PATENT DOCUMENTS 5,996,086 A 11/1999 Delaney et al.  
(Continued)

FOREIGN PATENT DOCUMENTS

JP 58151663 A 9/1983  
(Continued)

OTHER PUBLICATIONS

Japanese Office Action from Japanese Patent Office for Japanese Patent Application No. 2005-254292, dated Aug. 17, 2010.

(Continued)

*Primary Examiner* — Stefan Stoynov  
(74) *Attorney, Agent, or Firm* — Stites & Harbison, PLLC; Juan Carlos A. Marquez, Esq; Nicholas B. Trenkle

(57) ABSTRACT

In a computer system in which a server has, in addition to a disk used for booting, an operation transfer destination disk that has the same content as the boot disk, a method for changing the disk used by the server or another server in the computer system for booting to the operation transfer destination disk is realized by changing the content of the operation transfer destination disk to enable the OS and applications installed in the operation transfer destination disk to be booted from the destination disk and by changing the setting of a boot program of the server to enable booting from the operation transfer destination disk.

20 Claims, 35 Drawing Sheets

U.S. PATENT DOCUMENTS

| | | |
|---|---|---|
| 6,415,382 B1 * | 7/2002 | Kwan ............................. 713/2 |
| 6,934,805 B2 * | 8/2005 | Hickman et al. ............. 711/114 |
| 6,963,981 B1 | 11/2005 | Bailey et al. |
| 6,971,044 B2 | 11/2005 | Geng et al. |
| 6,976,103 B1 | 12/2005 | Watanabe et al. |
| 7,117,393 B2 | 10/2006 | Baba et al. |
| 7,213,065 B2 | 5/2007 | Watt |
| 7,246,221 B1 | 7/2007 | Soltis et al. |
| 7,287,138 B2 | 10/2007 | Bland et al. |
| 7,549,076 B2 | 6/2009 | Hatasaki et al. |
| 2002/0103889 A1 | 8/2002 | Markson et al. |
| 2004/0172578 A1 * | 9/2004 | Chen et al. ...................... 714/15 |

FOREIGN PATENT DOCUMENTS

| | | | |
|---|---|---|---|
| JP | 2001-249853 A | 9/2001 | |
| JP | 2002-244818 | 8/2002 | |
| JP | 2002-278769 A | 9/2002 | |
| JP | 2003-29975 A | 1/2003 | |
| JP | 2005-071119 A | 3/2005 | |
| JP | 2005-115472 A | 4/2005 | |
| WO | WO 02086712 A1 | 10/2002 | |

OTHER PUBLICATIONS

Office Action, from Japan Patent Office, issued in corresponding Japanese Patent Application No. 2010-233195, dated May 8, 2012, pp. 1-5.

* cited by examiner

FIG. 4
SERVER MANAGEMENT TABLE

| SERVER IDENTIFIER | PHYSICAL POSITION | GROUP | TASK | STATUS | FAILOVER |
|---|---|---|---|---|---|
| S1 | A-0 | G1 | ACTIVE | ACTIVE | — |
| S2 | A-1 | G1 | ACTIVE | ACTIVE | — |
| S3 | B-0 | G2 | ACTIVE | FAILED | — |
| S4 | C-3 | G2 | ACTIVE | ACTIVE | — |
| S5 | E-6 | G3 | ACTIVE | FAILED OVER TO | Z-1 |
| S6 | X-0 | G1,G2 | STANDBY | STANDBY | — |
| S7 | Z-1 | G3 | STANDBY | ACTIVE | E-6 |
| S8 | Z-2 | G1,G2,G3 | STANDBY | STANDBY | — |

DISK MAPPING TABLE

| SERVER IDENTIFIER 501 | ID 502 | ACTIVE EXTERNAL DISK DRIVE 503 | ACTIVE DISK 504 | STANDBY EXTERNAL DISK DRIVE 505 | STANDBY DISK 506 |
|---|---|---|---|---|---|
| S1 | WWN0 | ARRAY0 | LU0 | ARRAY0 | LU100 |
| S1 | WWN1 | ARRAY0 | LU1 | ARRAY0 | LU101 |
| S2 | WWN2 | ARRAY0 | LU2 | ARRAY0 | LU102 |
| S2 | WWN3 | ARRAY0 | LU3/LU4 | ARRAY0 | LU103 |
| S3 | WWN10 | ARRAY1 | LU0 | ARRAY5 | LU100 |
| S3 | WWN11 | ARRAY1 | LU1 | ARRAY5 | LU101 |
| S4 | WWN12 | ARRAY1 | LU2 | ARRAY5 | LU102 |
| S4 | WWN13 | ARRAY1 | LU3 | ARRAY5 | LU103 |
| S5 | MAC0 | ARRAY2 | LU0 | ARRAY2 | LU100 |
| S5 | MAC1 | ARRAY2 | LU1 | ARRAY2 | LU101 |
| S6 | WWN50 | — | — | — | — |
| S6 | WWN51 | — | — | — | — |
| S7 | MAC50 | — | — | — | — |
| S7 | MAC51 | — | — | — | — |
| S8 | WWN90 | — | — | — | — |
| S8 | WWN91 | — | — | — | — |
| S8 | MAC90 | — | — | — | — |
| S8 | MAC91 | — | — | — | — |

FIG. 6

DISK SYNCHRONIZATION TABLE

| EXTERNAL DISK DRIVE | MAIN DISK | SUB DISK |
|---|---|---|
| ARRAY0 | LU0 | LU100 |
| ARRAY0 | LU1 | LU101 |
| ARRAY0 | LU2 | LU102 |
| ARRAY0 | LU3 | LU103 |
| ARRAY0 | LU4 | LU104 |
| ARRAY1 | LU0 | LU100 |
| ARRAY1 | LU1 | LU101 |

FIG. 7

DISK MAPPING MODULE

ACCESS ENABLE TABLE

| ACCESS ENABLED ID | DISK No. |
|---|---|
| WWN0 | LU0 |
| WWN1 | LU1 |
| WWN2 | LU2 |
| WWN3 | LU3 |
|  | LU4 |
| MAC20 | LU20 |
| MAC21 | LU21 |

FIG. 16

| SERVER IDENTIFIER 501 | ID 1601 | CONNECTION DESTINATION NETWORK SWITCH ID 1602 | CONNECTION DESTINATION NETWORK SWITCH PORT ID 1603 |
|---|---|---|---|
| S1 | WWN0 | SW1 | 1 |
| S1 | WWN1 | SW1 | 2 |
| S2 | WWN2 | SW1 | 3 |
| S2 | WWN3 | SW1 | 4 |
| S3 | WWN10 | SW1 | 5 |
| S3 | WWN11 | SW1 | 6 |
| S4 | WWN12 | SW1 | 7 |
| S4 | WWN13 | SW1 | 8 |
| S5 | MAC0 | SW2 | 1 |
| S5 | MAC1 | SW2 | 2 |
| S6 | WWN50 | SW1 | 9 |
| S6 | WWN51 | SW1 | 10 |
| S7 | MAC50 | SW2 | 3 |
| S7 | MAC51 | SW2 | 4 |
| S8 | WWN90 | SW3 | 1 |
| S8 | WWN91 | SW3 | 2 |
| S8 | MAC90 | SW3 | 3 |
| S8 | MAC91 | SW3 | 4 |

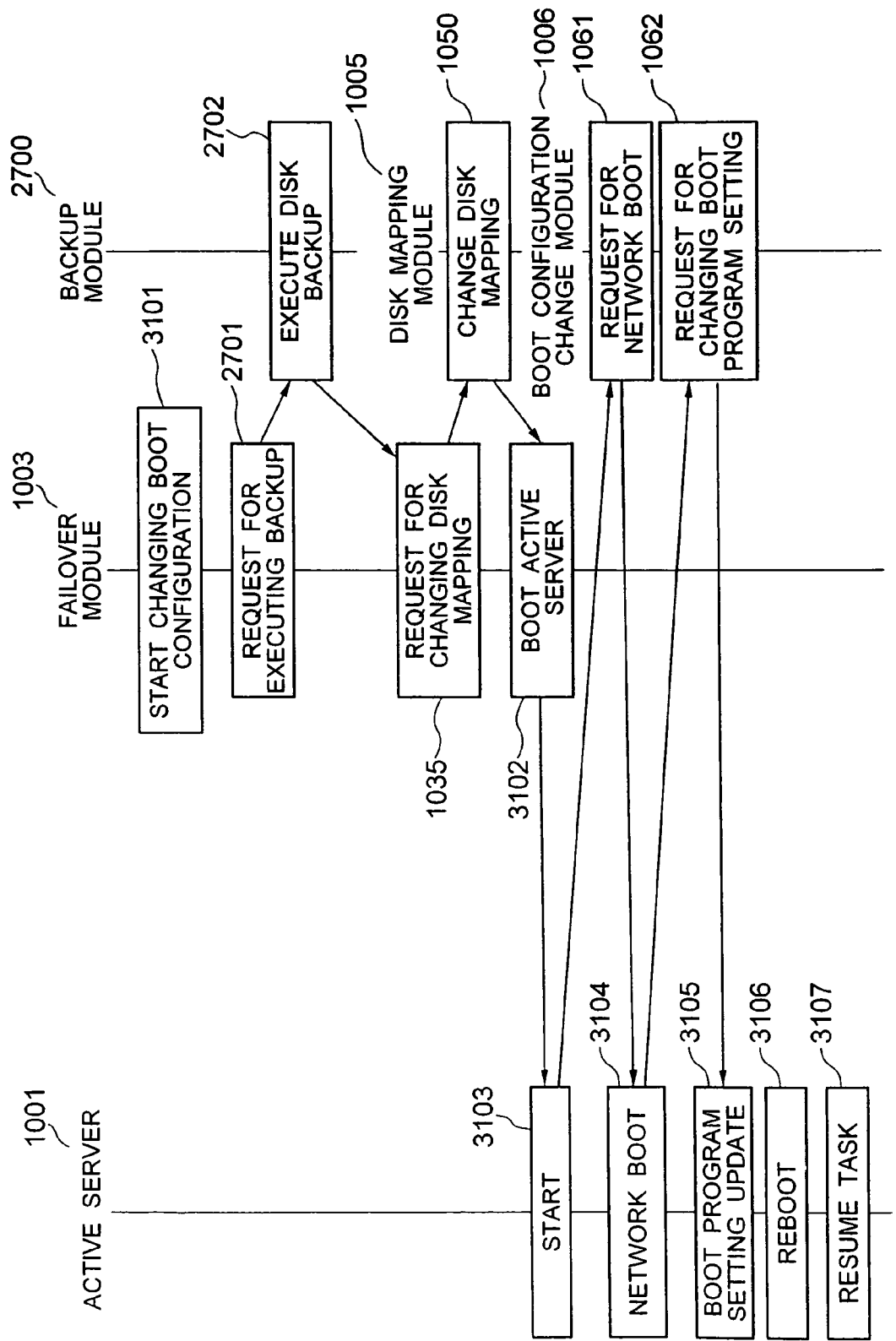

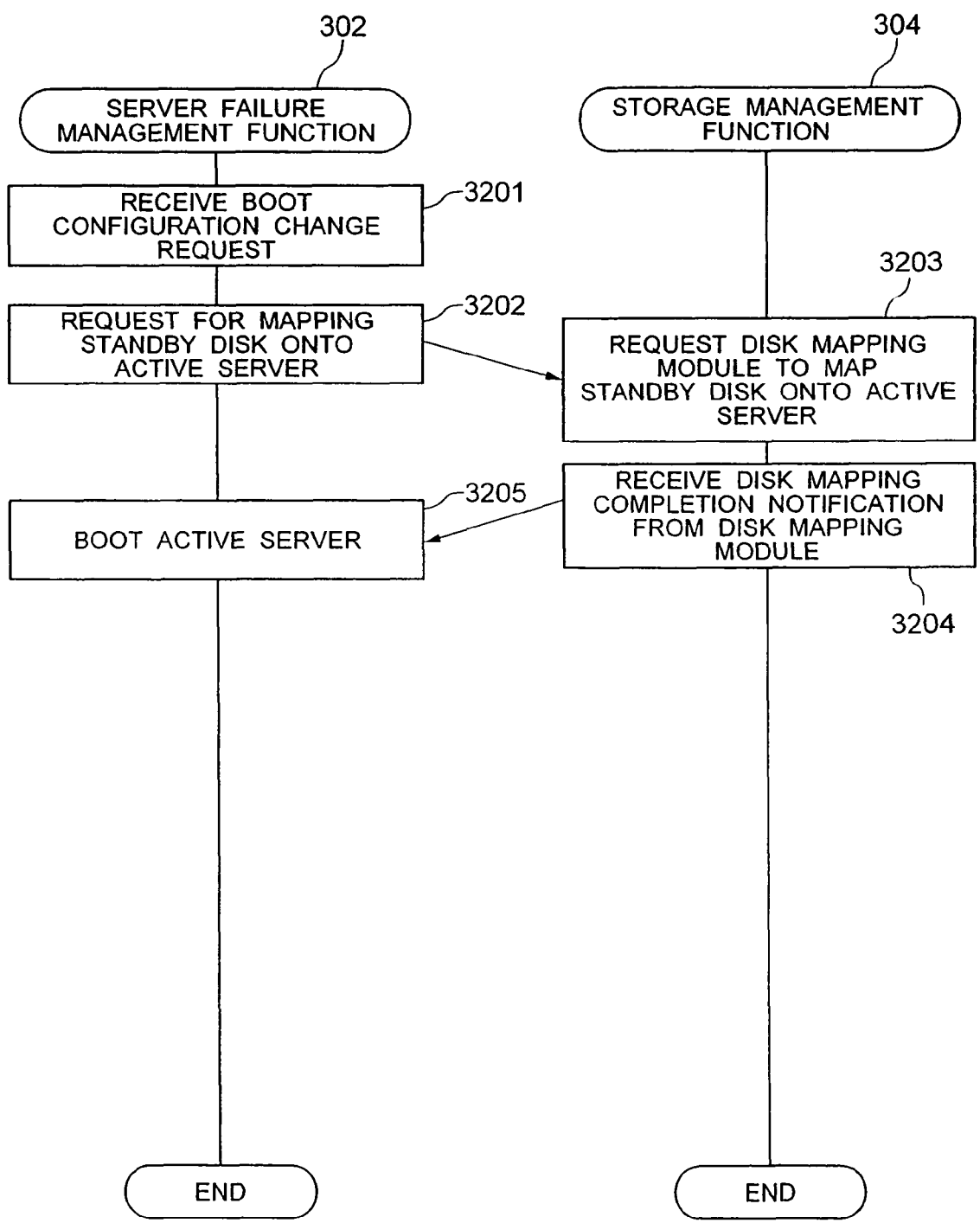

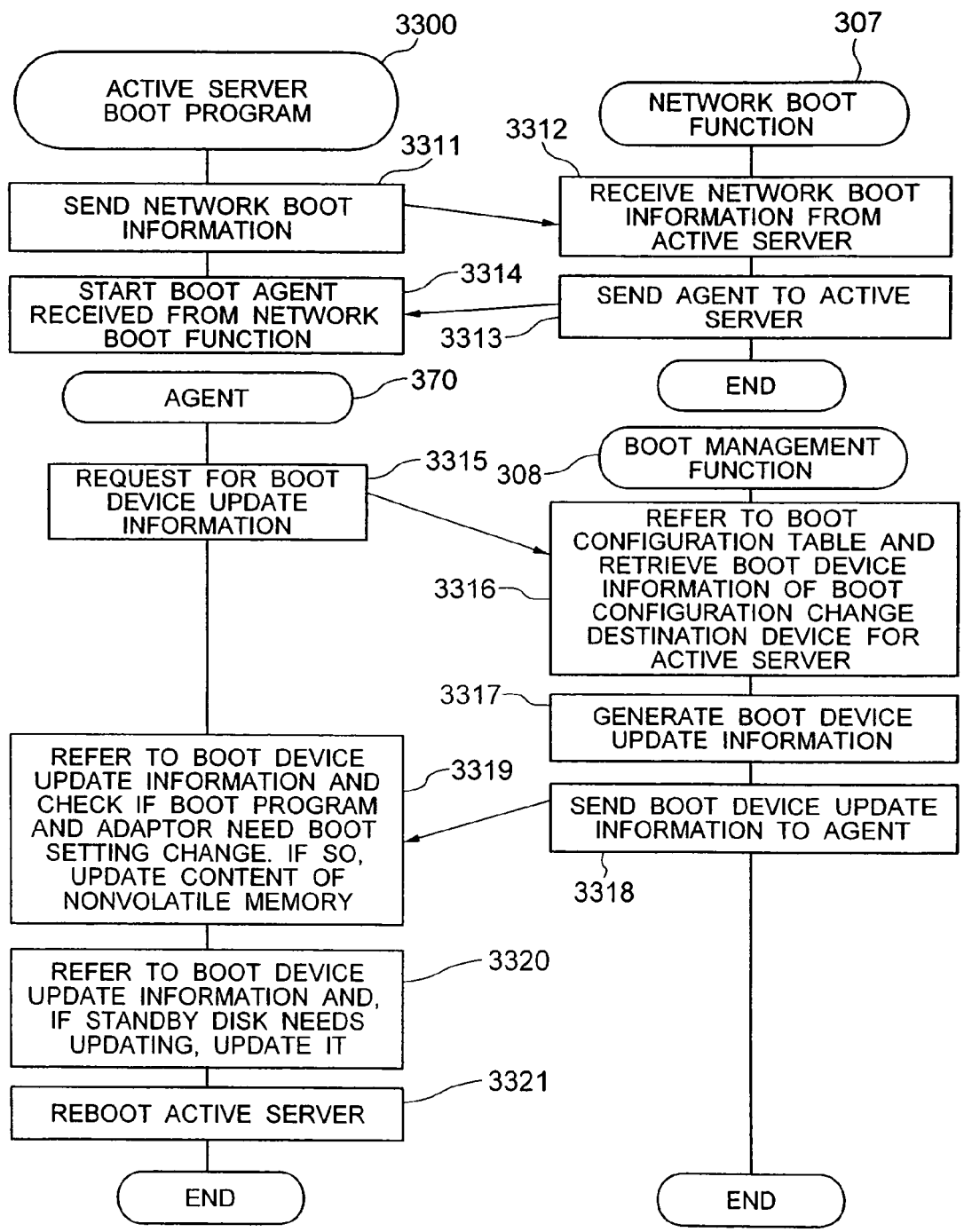

FIG. 34

| SERVER IDENTIFIER 5101 | BOOT DEVICE 5102 | DEVICE PATH 5103 | TARGET WWN 5104 | TARGET LUN 5105 | BOOT PROGRAM SETTING INFORMATION 5106 |
|---|---|---|---|---|---|
| S1 | SAN | /dev/sda1 | aaaa | 0 | XXX1 |
| S1 | IDE | /dev/hda1 | — | — | XXX2 |
| S2 | SAN | /dev/sda3 | aaaa | 0 | XXX3 |
| S2 | SCSI | /dev/sda1 | — | 0 | XXX4 |
| S3 | SAN | /dev/sda1 | bbbb | 1 | XXX5 |
| S3 | iSCSI | /dev/sda1 | eeee | 0 | XXX6 |
| S4 | SAN | /dev/sda1 | bbbb | 1 | XXX7 |
| S4 | IDE | /dev/hda1 | — | — | XXX8 |
| S5 | iSCSI | /dev/sda3 | cccc | 2 | XXX9 |
| S6 | SAN | /dev/sda1 | cccc | 2 | XXXA |
| S6 | SAN | /dev/sda2 | eeee | 1 | XXXB |
| S7 | SAN | /dev/sda1 | dddd | 3 | XXXC |
| S7 | iSCSI | /dev/sda1 | bbbb | 1 | XXXD |
| S8 | iSCSI | /dev/sda1 | dddd | 3 | XXXE |
| S8 | SCSI | /dev/sda5 | — | 1 | XXXF |

METHOD FOR CHANGING BOOTING CONFIGURATION AND COMPUTER SYSTEM CAPABLE OF BOOTING OS

CROSS-REFERENCE TO RELATED APPLICATION

This application is a Continuation application of U.S. application Ser. No. 12/232,653 filed Sep. 22, 2008, which issued as U.S. Pat. No. 8,015,396 on Sep. 6, 2011 and is a Continuation of U.S. application Ser. No. 11/269,702 filed Nov. 9, 2005, which issued as U.S. Pat. No. 7,444,502 on Oct. 28, 2008. The present application claims priority from U.S. application Ser. No. 12/232,653 filed Sep. 22, 2008, which claims priority from U.S. application Ser. No. 11/269,702 filed Nov. 9, 2005, which claims priority from Japanese Patent Application No. 2005-254292 filed Sep. 2, 2005, the entire content of which is incorporated herein by reference for all purposes.

Further, the present invention is related to U.S. patent application Ser. No. 11/033,724 filed Jan. 13, 2005, issued as U.S. Pat. No. 7,549,076 on Jun. 16, 2009 and is entitled "Failover Method through Disk Takeover and Computer System Having Failover Function," the entire content of which is incorporated herein by reference for all purposes.

BACKGROUND OF THE INVENTION

The present invention relates to a method for changing a booting configuration to change a disk that a server uses for booting.

Generally, a server boots an OS installed in a built-in disk drive. However, as a demand for disk capacity from the server increases and the remaining capacity of the disk drive becomes small, it is necessary to change the disk drive incorporated in the server. Further, since a backup of the disk drive needs to be done by starting backup software by each server, it takes time. As the number of servers increases, the amount of work in replacing many server disk drives and in backing them up becomes inhibitively large.

There is a configuration in which a server boots an OS by using a disk in an external disk drive through a network. In this configuration, when the remaining disk capacity is running low, disks can easily be added to the external disk drive, completing the disk extension work easily. Further, since a copy can be made among a plurality of disks in the external disk drive, the backup can be done without the server having to start the software. In a computer system in which a plurality of servers boot from disks in an external disk drive, since the single external disk drive can incorporate the disks used by all servers, installation of additional disks and disk backup can be performed on one external disk drive, which in turn reduces the additional time and labor required when the number of servers increases. Further, in this configuration since it is possible to access a plurality of servers in the computer system via network and network switch, the boot disk of a particular server connected to the external disk drive can be referenced by another server. Therefore, in the event of a failure in the operating server, this configuration allows the active service to be taken over by another server by using the boot disk of the failed server. This is described in the preceding U.S. patent application Ser. No. 11/033,724 filed by the same inventor of this application.

SUMMARY OF THE INVENTION

From this background, a method is being called for which can change the configuration of a computer system composed of servers that boot from incorporated disks into a configuration that allows the servers to boot from an external disk drive, in order to reduce the work in installing additional disks and performing a backup and to enable a continued service in the event of a server failure by another server taking over the disk. To realize this requires copying a data portion of the server into the external disk drive and rebuilding a system portion including server's OS and application programs. This process becomes very onerous as the scale of the computer system grows.

Further, in a computer system constructed of servers that boot from an external disk drive, there is a growing demand for a method which transfer a server task that was built under, for example, a test environment to another active server. This requires booting a destination server from the disk of the external disk drive used by the server in the test environment. To realize this, it is necessary to change settings in a boot program of the destination server so that the destination server can boot from the disk of the external disk drive used by the test server.

An object of this invention is to provide a method for changing a disk used by a server for booting which can reduce the work required to change the server boot disk by rendering unnecessary the rebuilding of server OS and applications and the setting of a server boot program.

In reconfiguring the system so that a server that normally boots from its built-in disk can be booted from an external disk drive, software must be rebuilt, requiring a large amount of work in a large-scale computer system.

Further, in a computer system in which servers boot from disks in an external disk drive, transferring a task of one server to another server requires changing the setting of a boot program in order for the second or takeover server to be bootable from an external disk used by the first or original server.

In a computer system in which at least one server is connected to an external disk drive on a network and in which the server can boot an operating system (OS) from the external disk drive, a method is provided that changes a disk used by the server or another server in the computer system for booting to a boot transfer destination disk used by the first server. In this method, the change of a disk used by the server for booting is realized by synchronizing the content of the boot transfer destination disk with that of the original boot disk, changing the content of the boot transfer destination disk to enable the OS and applications installed in the boot transfer destination disk to be booted from the boot transfer destination disk, and changing the setting of a boot program of the server to make the OS and applications bootable from the boot transfer destination disk.

The task to be realized by this invention is to provide a method for changing a server boot disk which obviates the need to rebuild OS and applications of the server and the setting of the server boot program, thereby reducing the amount of work done in changing the disk for server booting.

Other objects, features and advantages of the invention will become apparent from the following description of the embodiments of the invention taken in conjunction with the accompanying drawings.

BRIEF DESCRIPTION OF THE DRAWINGS

FIG. 4 shows a server management table.

FIG. 5 shows a disk mapping table.

FIG. 6 shows a disk synchronization table.

FIG. 7 shows a configuration of a disk mapping module.

FIG. 16 shows a server management table (embodiment 2).

FIG. 31 shows a sequence diagram of this invention (embodiment 6).

FIG. 32 shows a sequence diagram of a server failure management function and a storage management function (embodiment 6).

FIG. 33 shows a sequence diagram of an active server boot program, a network boot function, an agent, and a boot management function (embodiment 6).

FIG. 34 shows a boot configuration table (embodiment 1).

DETAILED DESCRIPTION OF THE EMBODIMENTS

Figure 1:
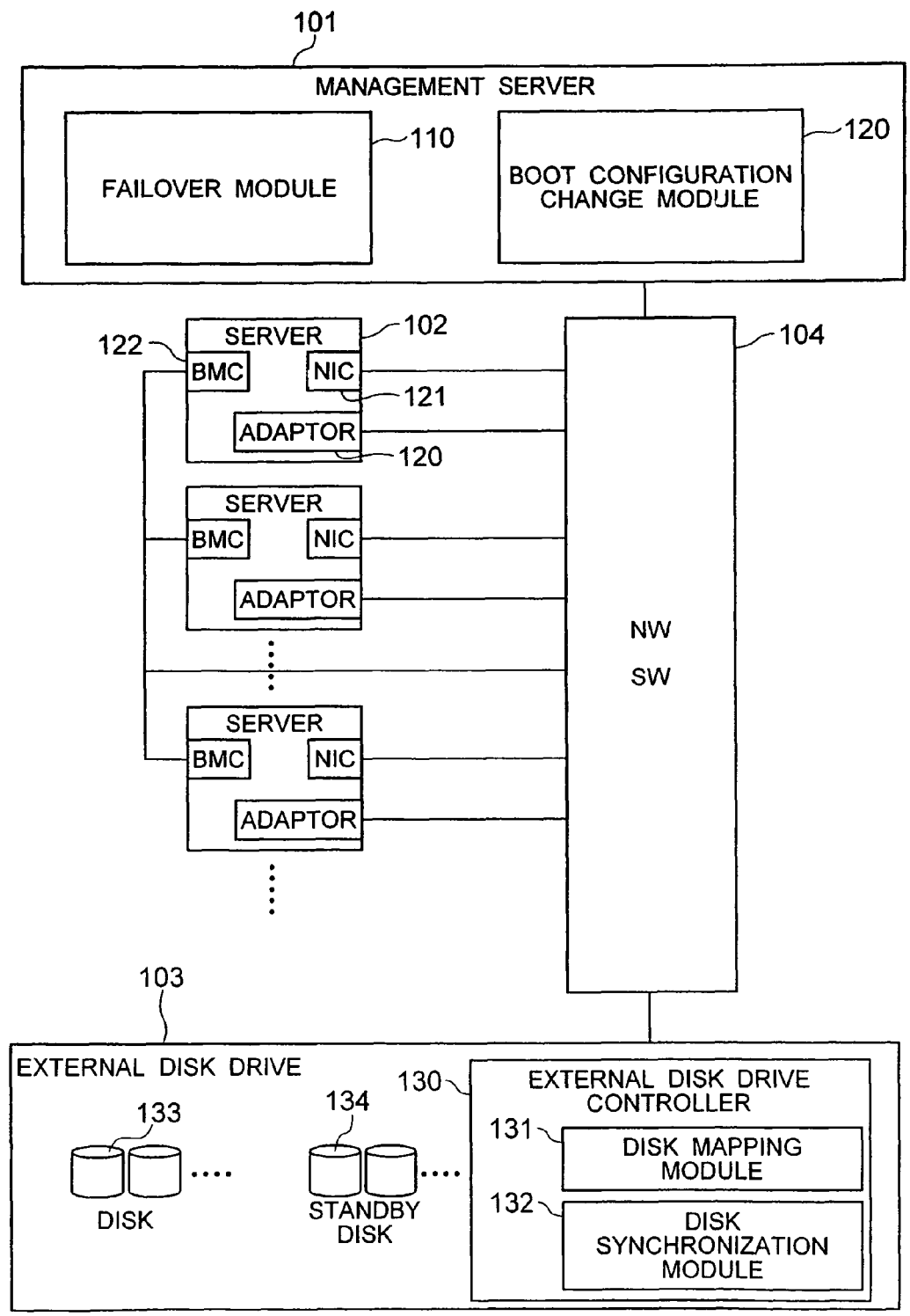
FIG. 1 shows an overall configuration of this invention (embodiment 1).

FIG. 1 shows an overall configuration of one embodiment of this invention. The system of this embodiment has a plurality of servers 102. These servers are connected to a network switch (NW SW) 104 through a network interface card (NIC) 121 and a network adapter 120. The network switch may be an IP protocol handling switch or a fiber channel switch. The network switch to which the adapter 120 is connected may be other than the one to which the NIC 121 is connected. The network switch 104 is connected to an external disk drive 103 and can be accessed by the server 102. The network switch 104 is also connected to a management server 101 that manages the system. Each of the servers 102 incorporates a BMC (baseboard management controller) 122. The BMC 122 is connected to the management server 101 through the network so that it can monitor the status of hardware in each server and control power supply. The external disk drive has an external disk drive controller 130 for its control. The external disk drive controller 130 has a disk mapping module 131 and a disk synchronization module 132. The disk mapping module 131 manages those disks that are accessible from the servers 102 connected to the external disk drive 103. The disk synchronization module 132 performs control to synchronize the content of the disks 133 in the external disk drive with that of standby disks 134. The management server 101 comprises a failover module 110 which, in the event of a failure of a server, transfers the task of the failed server to another server, and a boot configuration change module 120 to change the server boot configuration.

Figure 2:
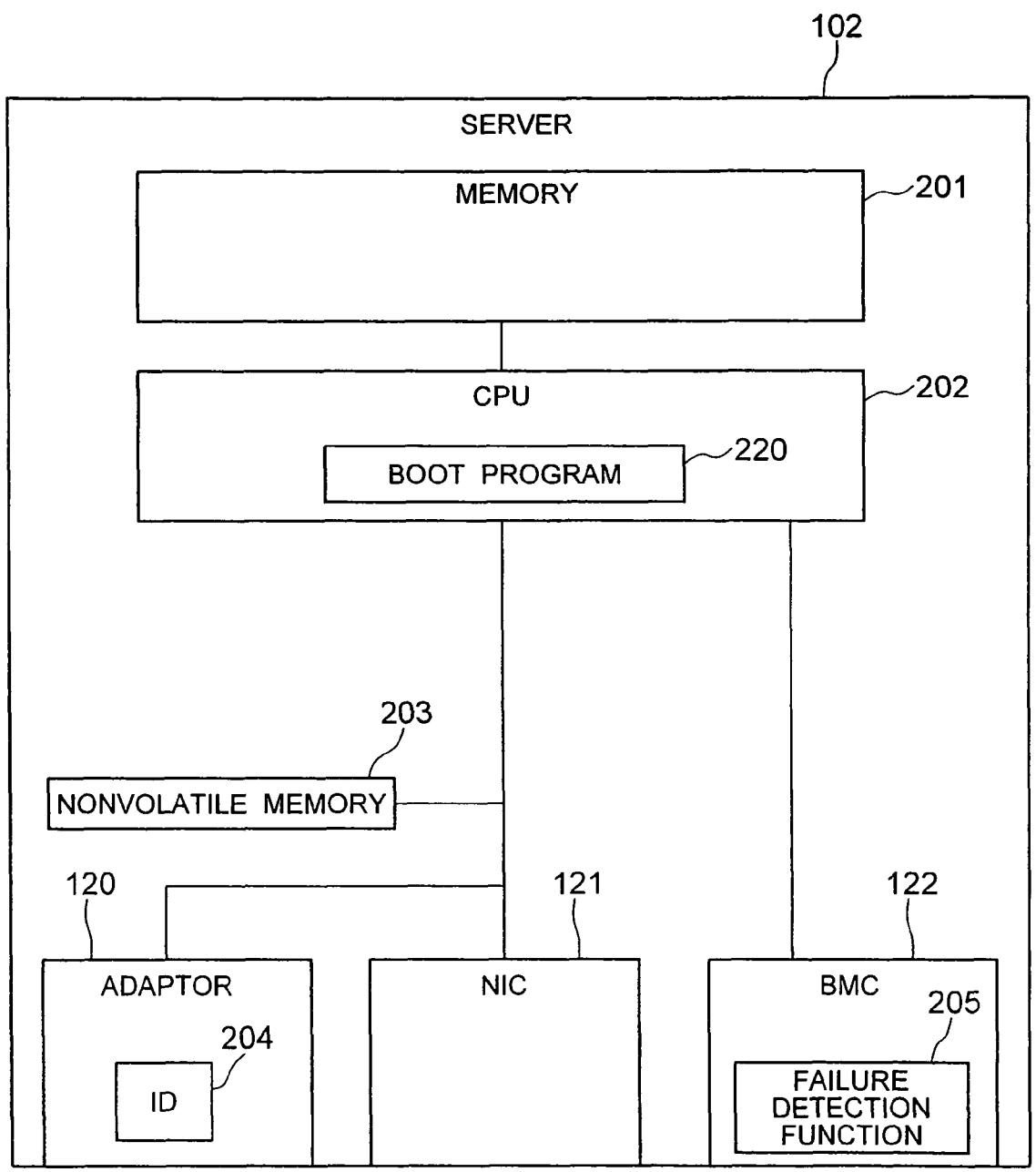
FIG. 2 shows a configuration of the server.

FIG. 2 shows a detailed configuration of the server 102 of this embodiment. The server 102 comprises a memory 201 to store programs and data, a CPU 202 to execute the programs in the memory, adaptor 120, NIC 121 and BMC 122. A boot program 220 is installed in the CPU. The adaptor 120 has its unique device identifier (ID) 204 stored in memory. The ID 204 is a. MAC address in the case of the network adapter and a WWN in the case of the fiber channel host adapter. The BMC 122 mainly performs monitoring and control on hardware of the server 102. When an anomaly occurs with hardware, a failure detection module 205 detects it and informs it to the external circuit. The power of the server 102 can be turned on or off remotely through the BMC 122. The boot program 220 is a program of, for example, system BIOS and EFI and, when the server 102 is powered on, operates in a way that causes the server to begin booting those devices that are used for booting and registered in advance with a nonvolatile memory 203. The boot program 220 can also be booted from an OS received by the adaptor 120 from the network.

Figure 3:
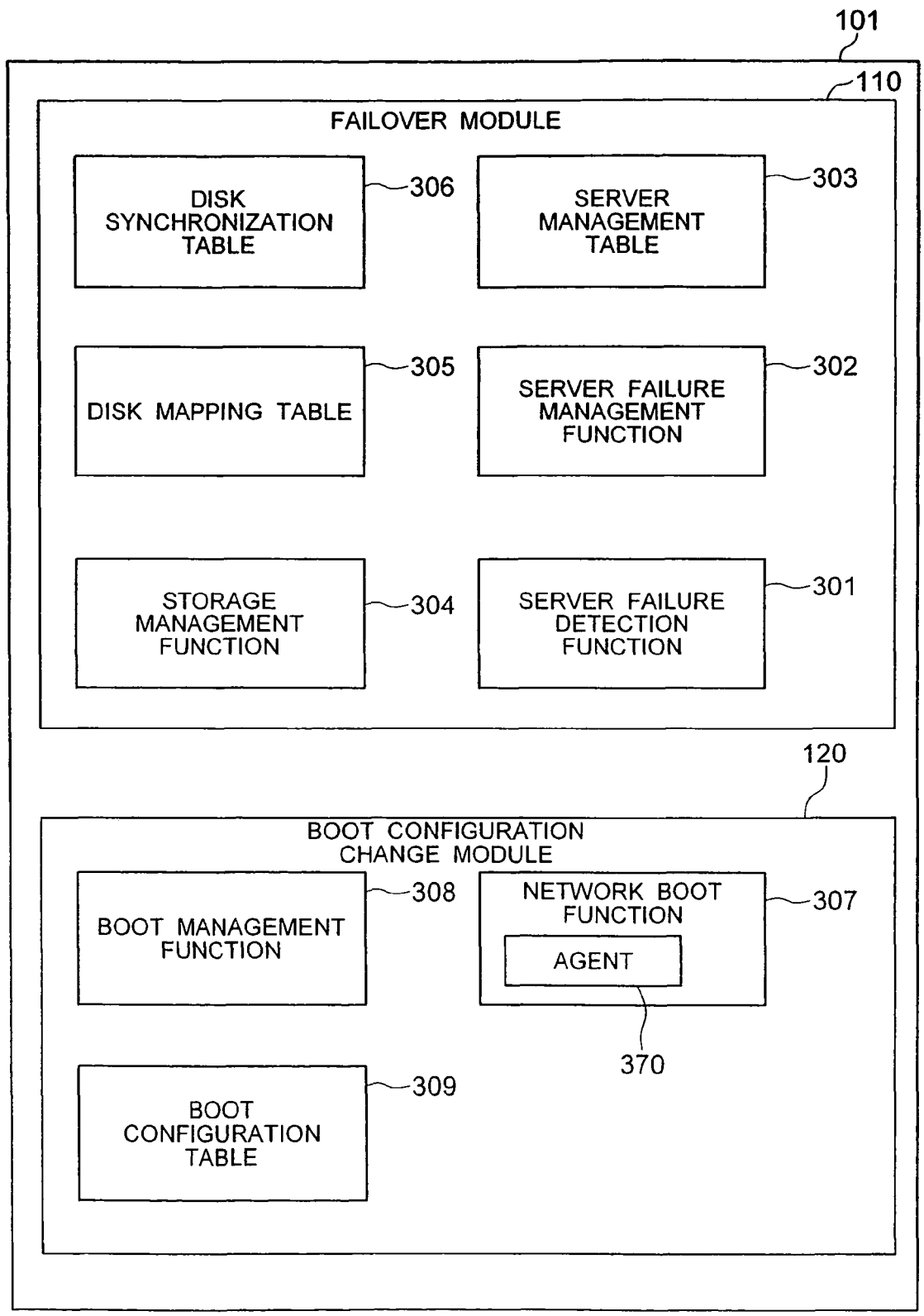
FIG. 3 shows a configuration of a management server.

FIG. 3 shows details of the failover module 110 and the boot configuration change module 120, both making up the management server 101 of FIG. 1, in this embodiment. The failover module 110 comprises a server failure detection function 301 to monitor the status of the server, a server failure management function 302 to execute a failover operation in the event of a server failure and a server power control, a server management table 303 representing physical positions of hardware in the server, task groups, task operation statuses and server operation status, a storage management function 304 to control the mapping and synchronization of disks used by the server, a disk mapping table 305 to manage the mapping state of the disks, and a disk synchronization table 306 to manage the synchronization status of the disks. The boot configuration change module 120 comprises a network boot function 307 to enable the server to be booted from the network, a boot management function 308 to change the server boot configuration, and a boot configuration table 309 representing statuses of boot devices of the server. The network boot function 307 sends an agent 330 to the server 102 through the network and the server 102 starts the received agent 370. The network boot function 307 is equivalent to a DHCP server function that makes the server 102 bootable by a PXE protocol.

FIG. 4 shows details of the server management table 303 of FIG. 3. The server management table 303 stores a list of servers to be controlled by the failover module 110, information on physical positions of servers and information on operation and status of tasks. A column 401 in the table stores server identifiers. The server identifiers 401 need only be information that can identify servers, such as serial number of a server or blade number of a blade server. A column 402 represents information on physical positions of servers, which are used in the invent of a server failure to locate the server corresponding to the failed portion. A column 403 represents task groups of the servers. The task groups include one or more operating servers that are executing tasks and standby servers that are not executing tasks. When an operating server belonging to the task group fails, a failover to a standby server belonging to the same task group is effected. A column 404 represents an operation status of the server. If a server of interest is executing a task, it is an operating server; and if the server is not operating, it is a standby server. A column 405 shows statuses of servers. It indicates whether individual servers are in a normal operation state or a failed state, or whether a failover has been executed. Based on this information, it is possible to check whether there is any server that requires a failover and to locate a server that can be chosen as a destination for the failover. A column 406 indicates a failover status of each server. For the servers that have been subjected to the failover operation, this column indicates server identifiers of the failover destination of these servers and their physical positions. The server that took over the task as a result of failover indicates its identifier and physical position information to the server that was operating the task before the failover. Based on the information in the column 406, the server can be recovered from a failover state.

FIG. 5 shows details of the disk mapping table 305 of FIG. 3. A column 501 represents server identifiers. These identifiers are similar to those in column 401 of FIG. 4. A column 502 represents ID information of adapter 120 mounted on each server. For example, if the adaptor 120 is a network card, it represents a MAC address; and if the adaptor 120 is a fiber channel host bus adapter, it represents WWN. A column 503 represents an identifier of an external disk drive that has a boot disk for the server indicated at column 501. A column 504 represents an identifier of a boot disk in the external disk drive of column 503. A column 505 represents an identifier of an external disk drive that has a standby disk of the server of column 501. A column 506 represents an identifier of a standby disk existing in the external disk drive of column 505. Here, the standby disk in column 506 is a disk that is used by the standby server that will take over the task during a failover in the event of a server failure. The column 504 includes not just the boot disk information. When the server has a data disk in the external disk drive, the column 504 also includes the data disk information. Similarly, the column 506 also includes a standby disk for the data disk as well as the boot disk.

FIG. 6 shows details of the disk synchronization table 306 of FIG. 3. A column 601 represents identifiers of external disk drives. A column 602 represents a disk present in each external disk drive. A column 603 represents a sub disk that synchronizes with a content of a disk of column 602. A column 604 indicates whether or not the content of a disk in column 602 and the content of a disk in column 603 are in synchronism with each other. If they are in synchronism, a change made to a disk of column 602 is also reflected simultaneously on the associated sub disk of column 603. If they are not synchronized, the disk of column 602 and the sub disk of column 603 are updated independently of each other. It is noted that a pair of the disk of column 504 and the standby disk of column 506 in the disk mapping table of FIG. 5 in this embodiment is identical with a pair of the main disk of column 602 and the sub disk of column 603 in the disk synchronization table.

FIG. 7 shows details of the disk mapping function 131 in the external disk drive 103 of FIG. 1. The disk mapping function 131 performs mapping between the disks 133 of the external disk drive 103 and IDs of the adaptors 120 mounted on the servers 102. Those servers having an ID not represented by this mapping cannot reference the disks. This arrangement allows for a security setting that permits a particular disk to be accessed by only a particular server. For this security setting, the disk mapping function 130 of this embodiment has an access permit table shown in FIG. 7. A column 701 represents access-enabled IDs. A column 702 represents identifiers of disks whose ID in column 701 is access-enabled.

FIG. 34 shows details of a boot configuration table 309 of FIG. 3. A column 5101 represents identifiers of servers. A column 5102 represents a device that each server uses for booting. For example, when the server boots from the built-in disk, the boot device is IDE or SCSI. When the server boots from the fiber channel or iSCSI, the boot device is iSCSI or SAN. If there are two or more adapters 120 used by the server for booting, the boot devices can be identified by this boot device information. Two or more of the same server identifiers found in column 5101 provide information that allows the same server to boot from different boot devices. A column 5103 represents a device path for the boot device of each server. The device path, in the case of Linux for instance, is a special device/dev/sdal indicating an I/O device. GRUB and LILO, which are boot loaders for Linux, use this device path to identify the device to boot. Further, in Linux the devices that the file system such as EXT3 mounts are set in a file/etc/fstab and the above device path corresponds to a device to be mounted that is described in the setting file. The device path in the case of Windows (registered trademark) corresponds to a setup parameter of a boot device multi(0) disk(0) rdisk(0) partition(1) for a boot loader set in a boot.ini file. A column 5104 represents a target WWN of the boot device. For example, if the target device is an external disk drive, the target WWN is WWN of the port used for booting the external disk drive. A column 5105 represents a target LUN number of a boot device. The LUN number is a logical ID number of a disk in the external disk drive. In the case where the adaptor 120 mounted on the server 102 is a fiber channel HBA, the information in column 5104 and column 5105 represents a target device used by BIOS of HBA for booting. A column 5106 represents boot program setting information used by the boot program 220 for booting. When the boot program 220 is EFI, the boot program setting information includes, for example, a bus number and device number of PCI of the adaptor 120 used for booting and UUID of EFI for each partition.

Figure 8:
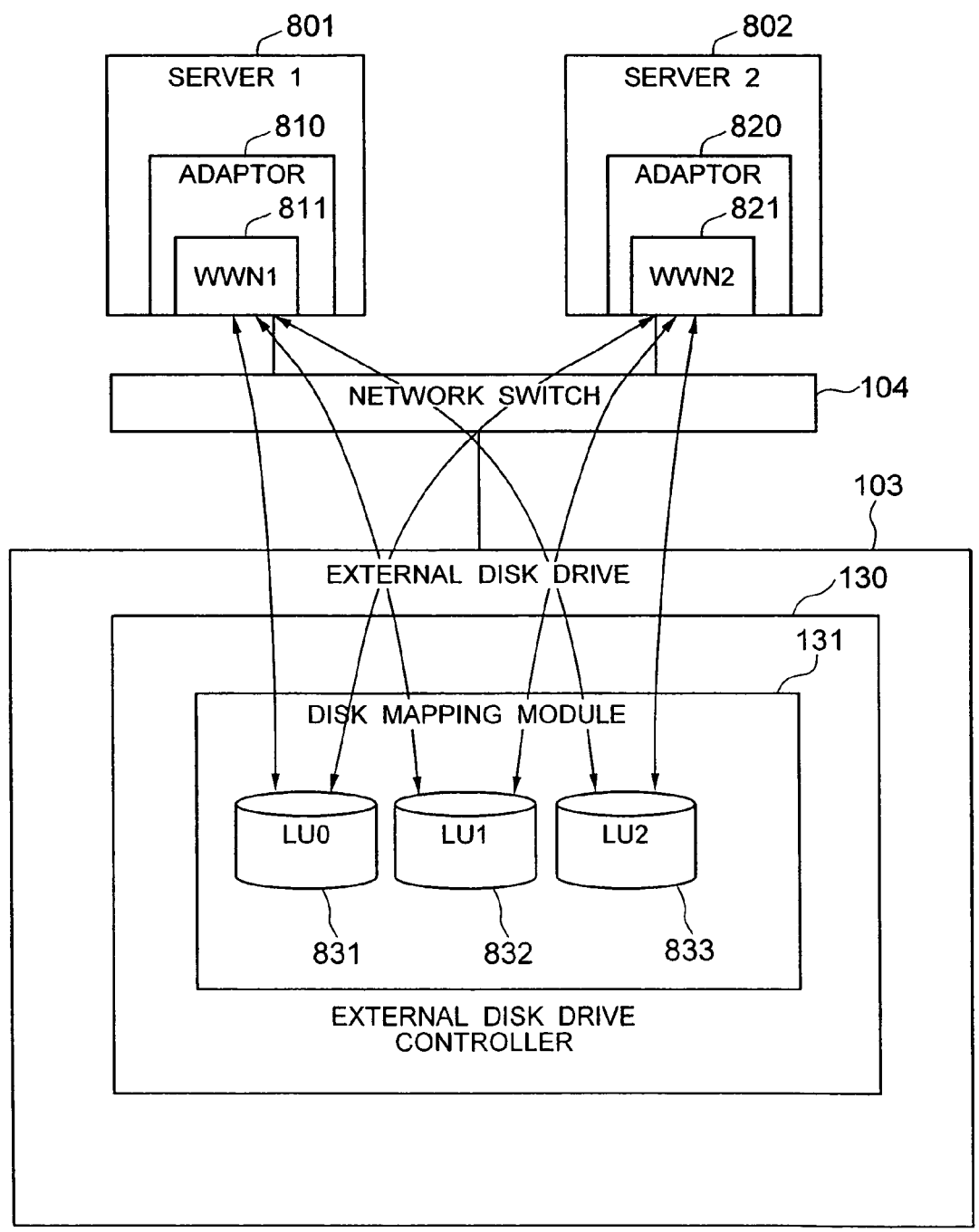
FIG. 8 shows an example configuration of disk mapping to the server.

FIG. 8 shows an example case of this embodiment in which the disk mapping is changed. The adaptor 810 mounted on the server 1 (801) has WWN1 (811) and the adaptor 820 mounted on the server 2 (802) has WWN2 (821). These are connected to an external disk drive 103 through a network switch 104. The mapping of disks is controlled by the disk mapping module 131, with the disks 831, 833 mapped to WWN1 (811) of the server 1 (801) and the disk 832 made accessible only by the server 2 (802). The disks 831, 832, 833 include a boot disk in which OS and business applications are installed.

Figure 9:
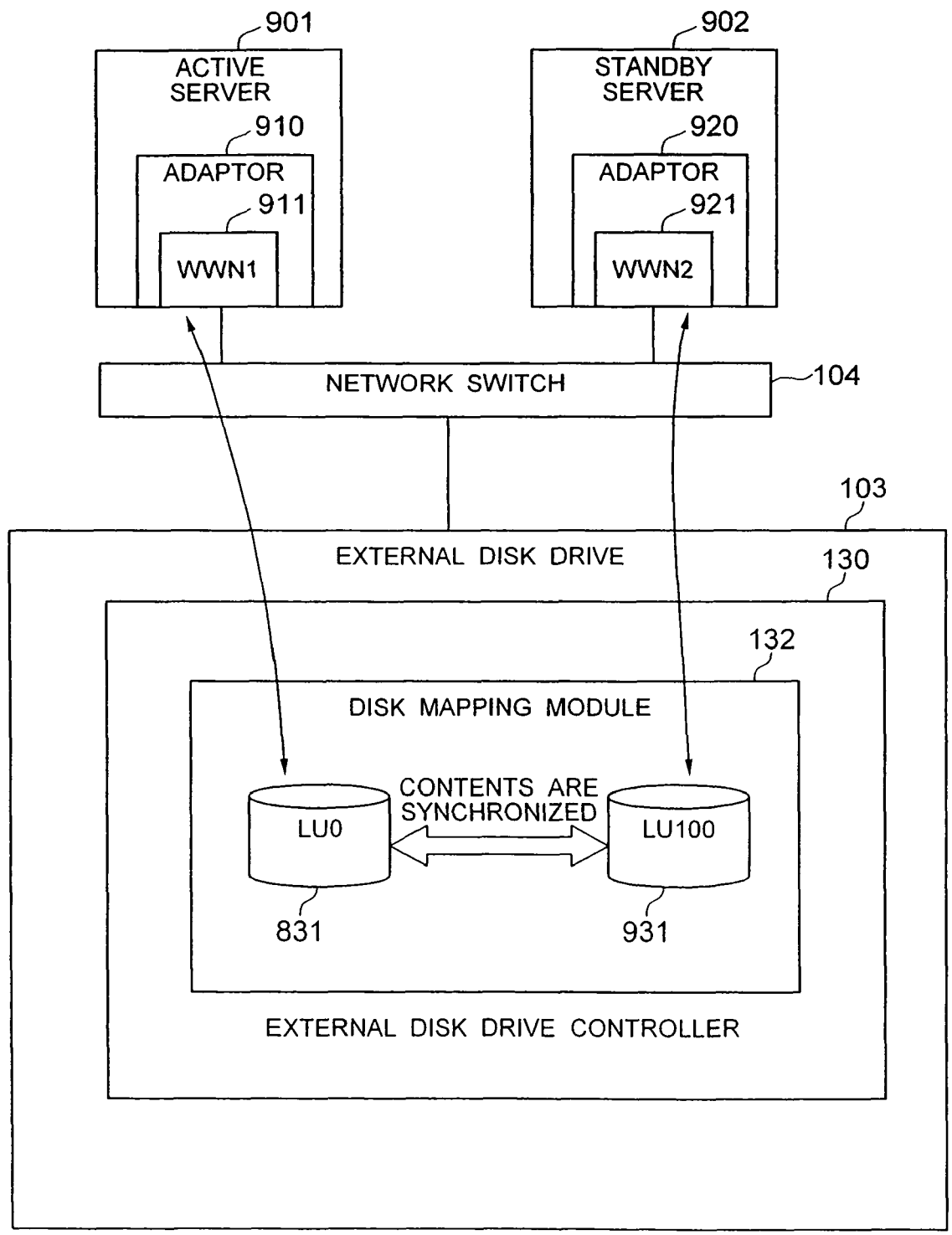
FIG. 9 shows an example of disk synchronization.

FIG. 9 shows an example of disk synchronization in this embodiment. An adaptor 910 mounted on an active server (901) has WWN1 (911) and an adaptor 920 mounted on a standby server (902) has WWN2 (921). These are connected to the external disk drive 103 via the network switch 104. The disk synchronization is controlled by the disk synchronization module 132 and a change made to a disk 831 is simultaneously reflected on a disk 931, thus keeping the contents of the disks 831 and 931 synchronized. In the example shown, the disk 831 is mapped to WWN1 (911) of the operating server (901) by the disk mapping module. In the event that the operating server (901) fails, the disk 831 and the disk 931 are immediately disconnected and released from the synchronized state, the disk 931 is mapped to WWN2 (921) of the standby server (902), and the standby server (902) is booted. This allows the standby server (902) to take over the current task from the active server (901) while keeping the active server (901) still able to access the disk 831.

Figure 10:
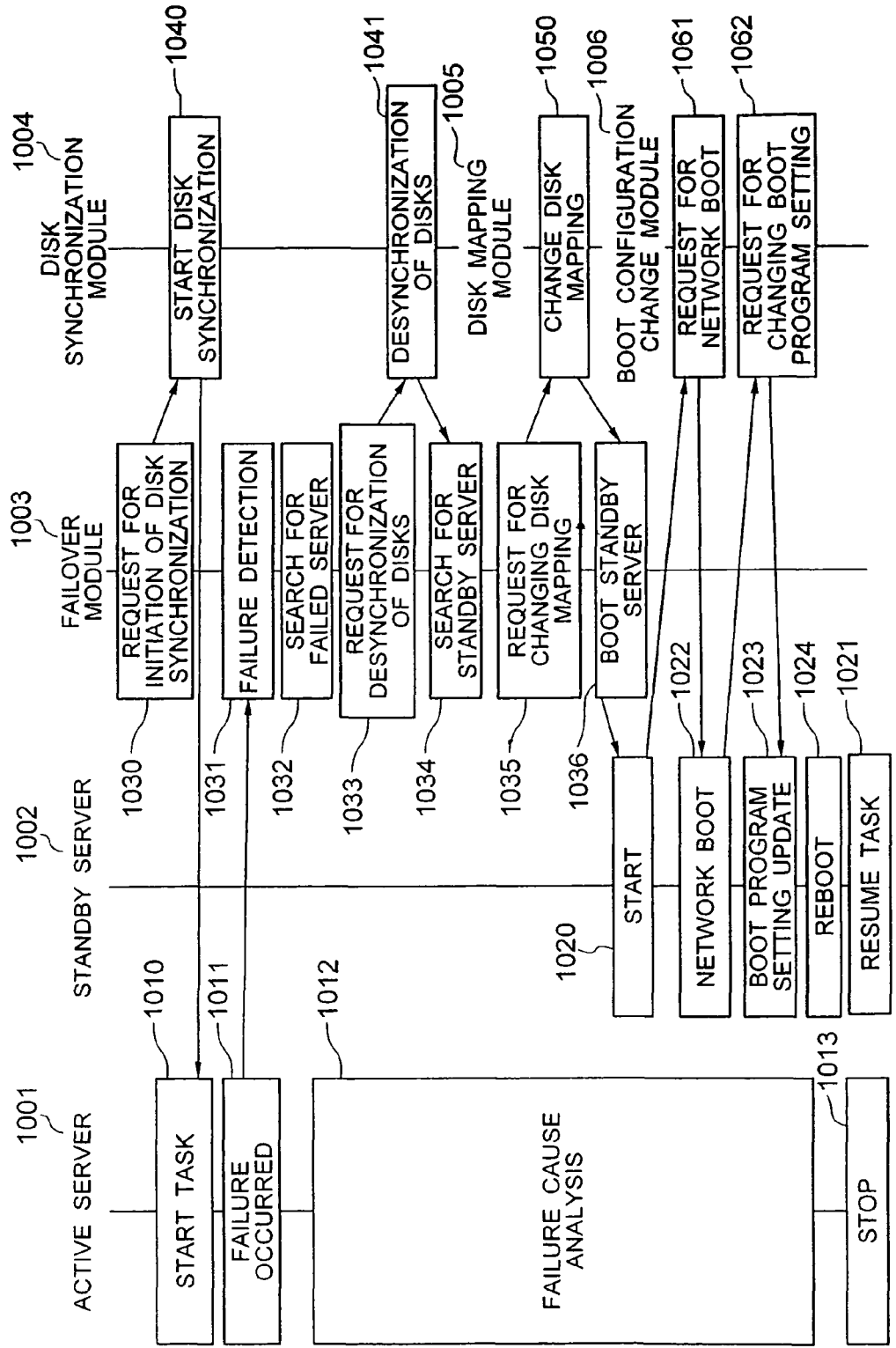
FIG. 10 shows a sequence diagram of this invention.

FIG. 10 shows an operation sequence in the embodiment of this invention. The sequence shows the operation of an active server 1001, a standby server 1002, a failover module 1003, a disk synchronization module 1004, a disk mapping module 1005 and a boot configuration change module 1006. Step 1030 represents the failover module 1003 making a request for starting the disk synchronization. Upon receiving this request, the disk synchronization module 1004 at step 1040 initiates the disk synchronization. The disks to be synchronized here are a main disk and a sub disk of the active server 1001 that are listed in the disk synchronization table of FIG. 6. Once the synchronization process is started, step 1010 initiates the operation of the active server. Now, the active server 1001 begins its service. Step 1011 shows that a trouble has occurred with the operating active server 1001. At step 1031 the failover module 1003 detects the occurrence of a failure. At the same time at step 1012 a failure cause analysis is performed on the failed active server 1001. This analysis includes dumping the OS memory onto the disk. In parallel with this step 1012, the failover module 1003 at step 1032 determines that the failed server is the active server 1001. Based on the result of step 1032, the failover module 1003 makes a request to the disk synchronization module 1004 to release the main disk and the sub disk of the active server 1001 from the synchronized state. At step 1041 the disk synchronization module 1004 disengage the main disk and the sub disk of the active server 1001 from the synchronized state. With the desynchronization complete, the failover module 1003 at step 1034 searches for a standby server 1002 corresponding to the active server 1001 by using the server management table shown in FIG. 4. At step 1035 the failover module 1003 makes a request to the disk mapping module 1005 to map the sub disk of the active server 1001 onto the standby server 1002. At step 1050 the disk mapping module 1005 maps the sub disk of the active server 1001 onto the standby server 1002. With the mapping complete, the failover module 1003 at step 1036 requires the standby server 1002 to boot. At step 1020 the standby server 1002 is booted and the boot program sends to the network information that the standby server 1002 is now operational. This information may, for example, be a magic packet that is broadcast to the network for the execution of PXE boot. Upon receiving the information sent at step 1020, the boot configuration change module 1006 at step 1061 makes a network boot request to the standby server 1002. The standby server 1002 then network-boots at step 1022 and a booted agent 370 starts communication with the boot configuration change module 1006. The boot configuration change module 1006 at step 1062 sends to the agent 370 a boot program setting change request for standby server 1002. The agent 370 at step 1023 changes the setting of the boot program in the standby server. What is changed here includes, for example, boot priority setting of system BIOS and EFI in the standby server, settings of boot devices, and a boot target device of adaptor 120 such as HBA. At step 1024 the agent 370 reboots the standby server. At step 1024 the standby server 1002 boots by using the mapped sub disk and at step 1021 takes over the task of the active server and resumes service. Even after the standby server 1002 has taken over the service, the active server 1001 can continue the failure cause analysis. When the failure cause analysis is complete, the active server 1001 is stopped at step 1012.

Figure 11:
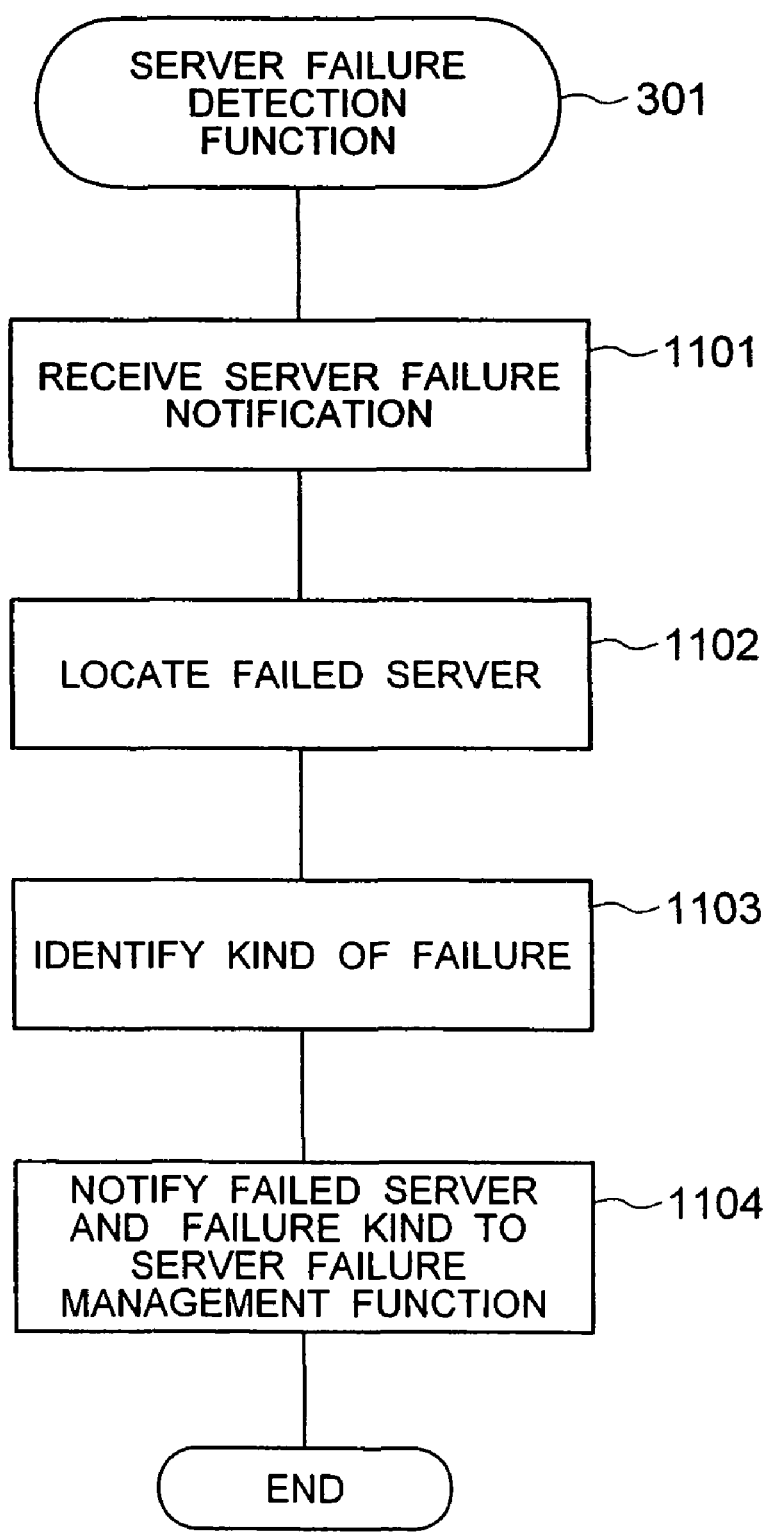
FIG. 11 shows a process flow of a server failure detection function.

In the following, the sequence of FIG. 10 will be explained in more detail. FIG. 11 shows a flow of operation of the server failure detection function 301. Step 1101 indicates that the server failure detection function 301 has received a server failure report through the network at time of server failure. When BMC 122 in the server 102 of FIG. 1 detects a failure, it notifies the failure of the server 102, or the server failure report, to the server failure detection function 301. At step 1102, the server failure detection function 301 uses the information in the server failure report on the physical position of the failed server to locate an identifier of the failed server. Next at step 1103, it determines the kind of the failure based on failure kind information contained in the server failure report. At step 1104 it notifies the information on the failed server and the kind of the failure to the server failure management function 302.

Figure 12:
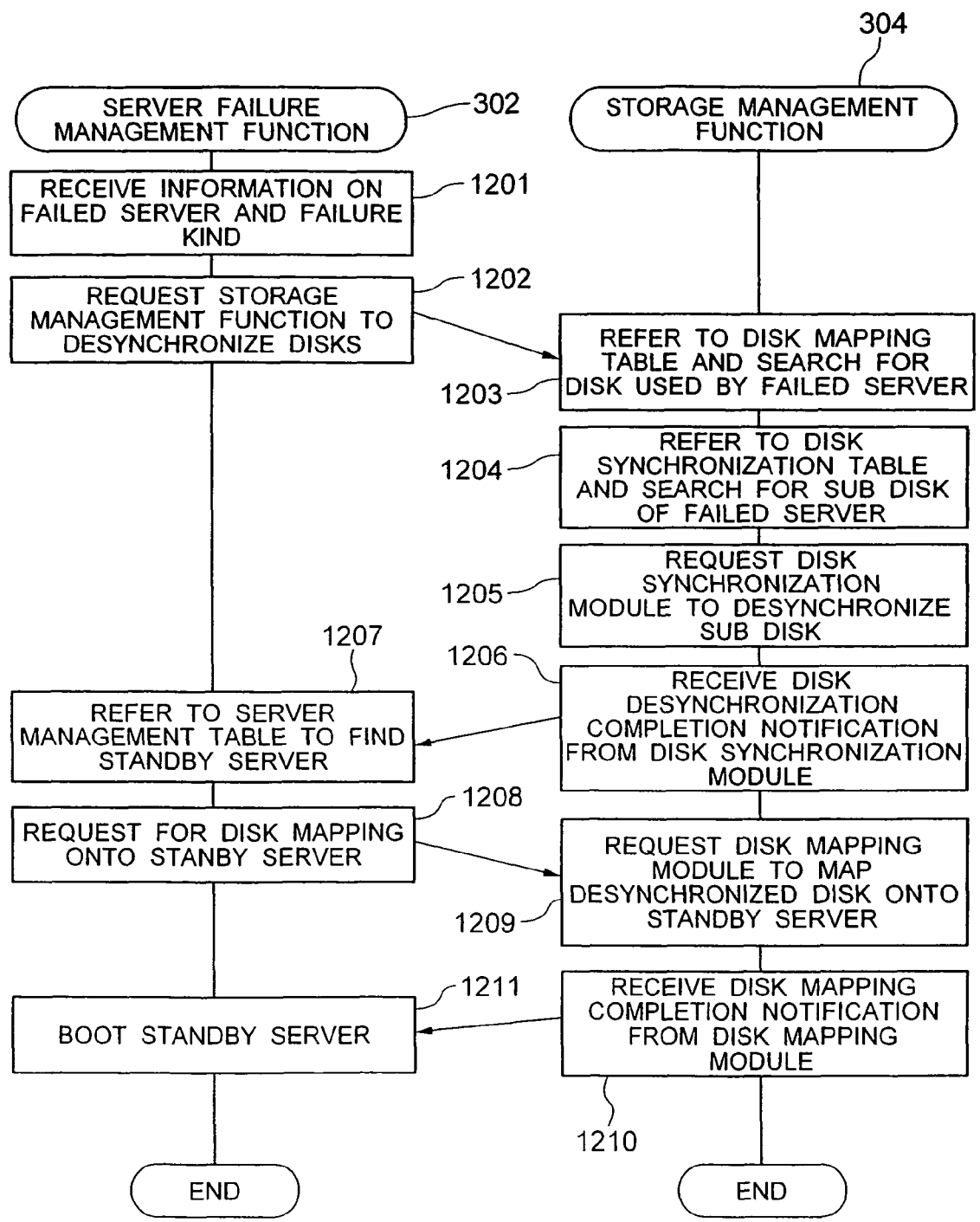
FIG. 12 shows a sequence diagram of a server failure management function and a storage management function.

FIG. 12 shows details of the server failure management function 302 and a sequence of steps performed by the storage management function 304. Step 1201 shows that the server failure management function 302 has received the identifier of the failed server and the kind of failure, both shown at step 1104 of FIG. 11. At step 1202, it makes a request to the storage management function 304 to desynchronize the disk of the failed server. The request includes information on the identifier of the failed server. At step 1203 the storage management function 304 refers to the disk mapping table of FIG. 5 and, based on the identifier of the failed server, searches for the disk used by the failed server. At step 1204, based on the information about the disk searched by step 1203, the storage management function 304 references the disk synchronization table of FIG. 6 to locate the sub disk. At step 1205 it makes a request to the disk synchronization module 132 of FIG. 1 to desynchronize the sub disk searched by step 1204 and the main disk. When the disk synchronization module 132 completes the desynchronization of the disks, the storage management function 304 receives a desynchronization completion notification at step 1206. At step 1207, the server failure management function 302 searches for a standby server, which is a failover destination for the failed server, by referring to the server management table of FIG. 4. At step 1208 the server failure management function 302 makes a request to the storage management function 304 to map the standby disk of the failed server onto the standby server found at step 1207. The request includes information on the identifier of the failed server. At step 1209, the storage management function 304 in turn makes a request to the disk mapping module 131 of FIG. 1 to map the standby disk of the failed server onto the standby server. In this embodiment, since the standby disk in the disk mapping table of FIG. 5 matches the sub disk in the disk synchronization table of FIG. 6, the disk mapping request causes the sub disk, which was requested by step 1205 for desynchronization, to be mapped onto the standby server. With the mapping process by the disk mapping module 131 complete, the storage management function 304 receives a disk mapping completion notification at step 1210. At step 1211 the standby server is booted. Now, the standby server is operational using the sub disk of the failed server.

Figure 35:
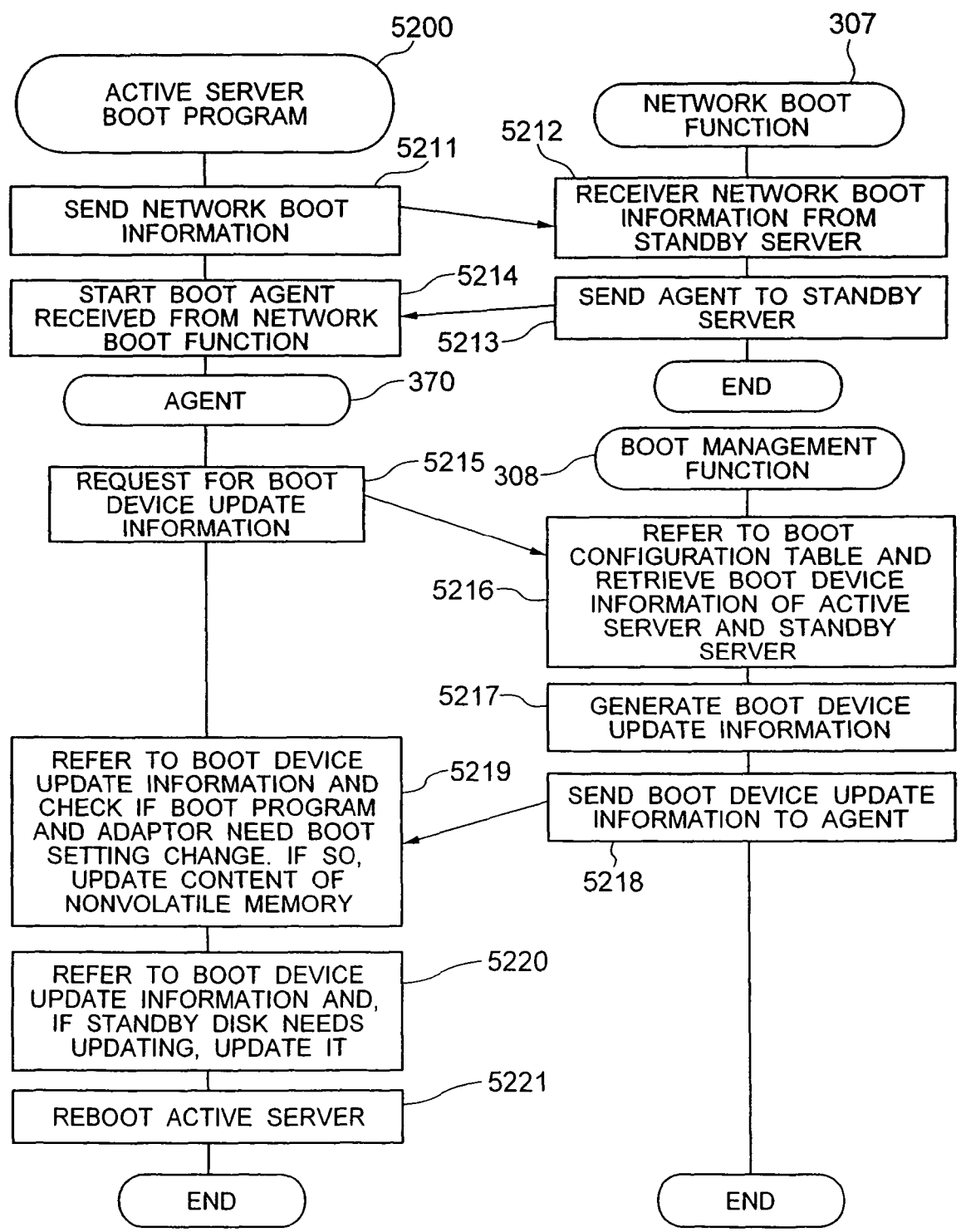
FIG. 35 shows a sequence diagram of a standby system server boot program, a network boot function, an agent, and a boot management function (embodiment 1).

FIG. 35 shows details of a sequence of steps performed by the network boot function 307, the boot management function 308 and the agent 370. Step 5211 shows that a boot program 5200, that is started after the standby server is booted, sends network boot information. The network boot information may be, for example, a magic packet sent to DHCP servers to execute a PXE boot. At step 5212 the network boot function 307 receives the network boot information sent at step 5211. Step 5213 shows that, upon receiving the network boot information, the network boot function 307 sends the agent 370 as a network boot program to the standby server. At step 5214 the boot program 5200 in the standby server boots the agent 370 received from the network boot function 307. At step 5215 the agent 370 started by step 5214 requests boot device update information from the boot management function 308. At step 5216 the boot management function 308 references the boot configuration table 309 and retrieves information used by the active server for booting and the information required by the standby server to boot from the standby disk 134. At step 5217 the boot management function 308 compares the boot device information retrieved by step 5216 of the active server and the standby server to check whether there is information to be updated, among the boot setting information on the standby server boot program 220 and adaptor 120 and information on boot device and mount point used by the operating system and application programs installed in the standby disk 134. The boot management function 308 then generates boot device update information containing those settings that need to be updated. At step 5218 the boot management function 308 notifies the agent 370 of the boot device update information generated by step 5217. At step 5219 the agent 370 receives the boot device update information and, if the boot setting information on the boot program 220 and adaptor 120 needs to be changed, updates the setting information registered with the nonvolatile memory 203. The nonvolatile memory 203 includes a nonvolatile memory mounted on the PCI card if the adaptor 120 is a PCI card, for example. As to the content to be updated, if the boot program is EFI, the boot program setting information 5106 in the boot configuration table 309 is registered as an EFI boot device path. As to the content to be updated for the adaptor 120, if the adaptor 120 is fiber channel HBA, WWN and LUN of the target device for boot that are set in HBA-BIOS are updated. At step 5220 the agent 370 checks the boot device update information to see if the content of the standby disk needs to be updated and, if so, updates it. If the standby disk has Linux installed as an operating system, the content of the standby disk to be updated includes the boot device information of boot loader of Linux and device mount information. At step 5221 the agent reboots the standby server. After rebooting, the standby server is not network-booted but is booted using the standby disk.

Embodiment 2

Embodiment 2 of this invention shows a booting configuration changing method that does not require the disk mapping module 131 that was used in the external disk drive controller 130 of embodiment 1.

Figure 13:
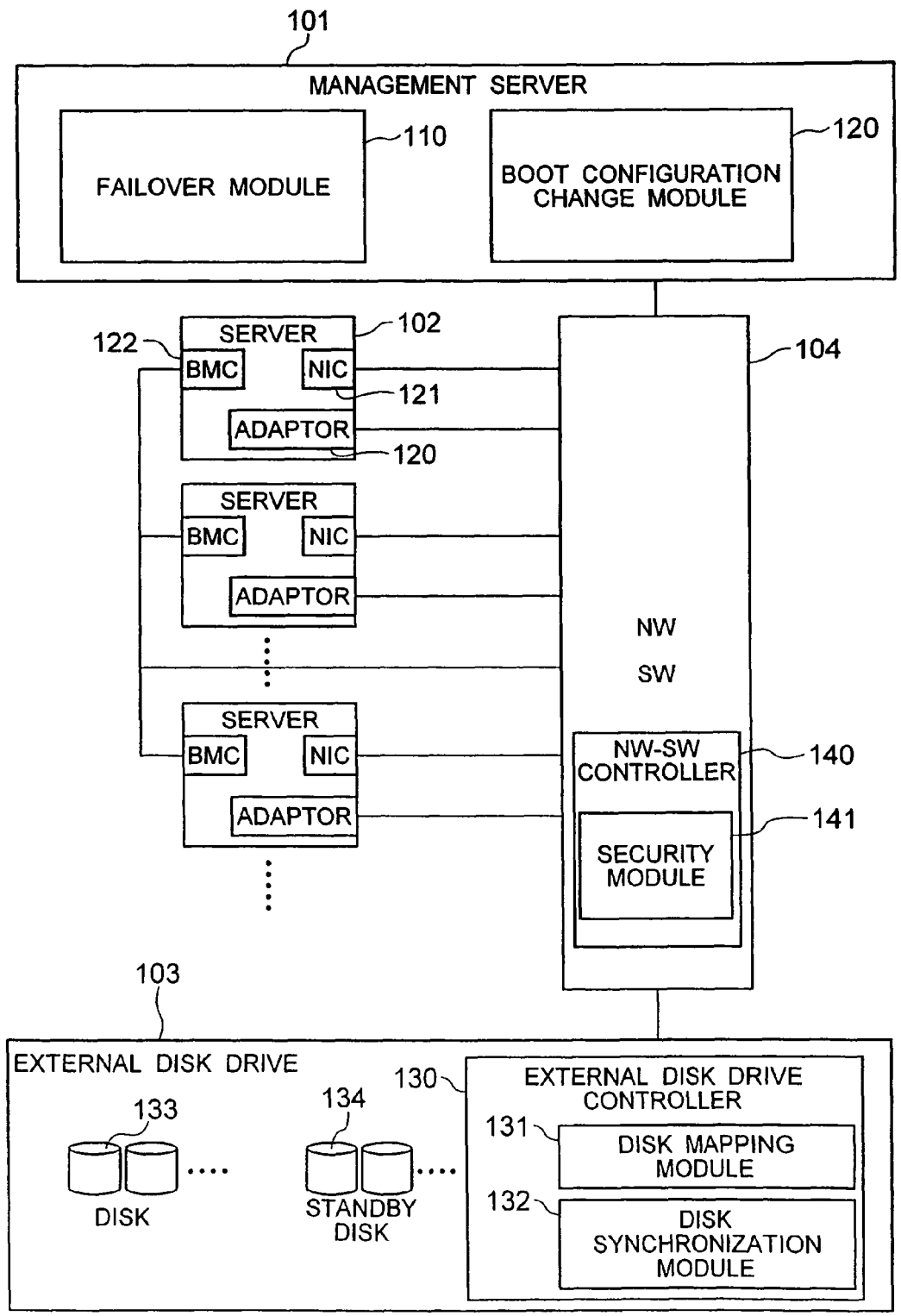
FIG. 13 shows an overall construction of this invention (embodiment 2).

FIG. 13 shows an overall configuration of embodiment 2 of this invention. What differs from embodiment 1 is that embodiment 2 has a security module 141 that is operated by a network switch controller 140 of the network switch 104. The disk mapping module 131 in the external disk drive controller 130 does not have to be provided. The security module 141 is a security function that limits devices connected to the network switch that are permitted to communicate with one another, such as server 102 and external disk drive 103. Examples of typical security function of the network switch 104 are VLAN and zoning.

Figure 14:
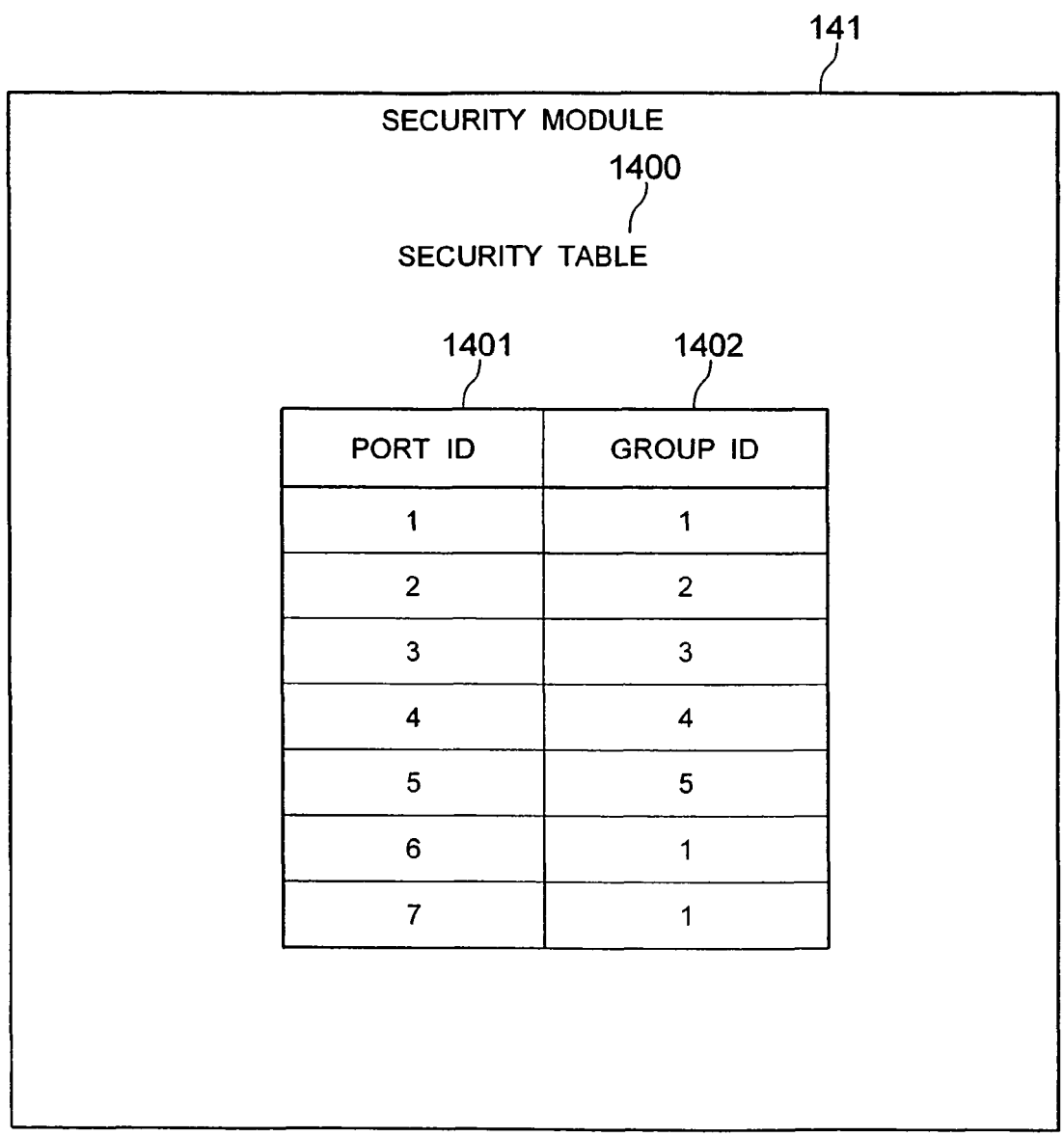
FIG. 14 shows a configuration of a security module (embodiment 2).

FIG. 14 shows details of the security module 141 of FIG. 13. The security module 141 has a security table 1400. A column 1401 shows a list of IDs representing physical positions of ports of the network switch 104. A column 1402 shows security groups to which port IDs belong. The security module 141 allows communication between the devices connected to ports whose security groups are the same. The port IDs in column 1401 may use WWN and MAC addresses, unique IDs of adaptors 120 for the devices connected to the ports.

Figure 15:
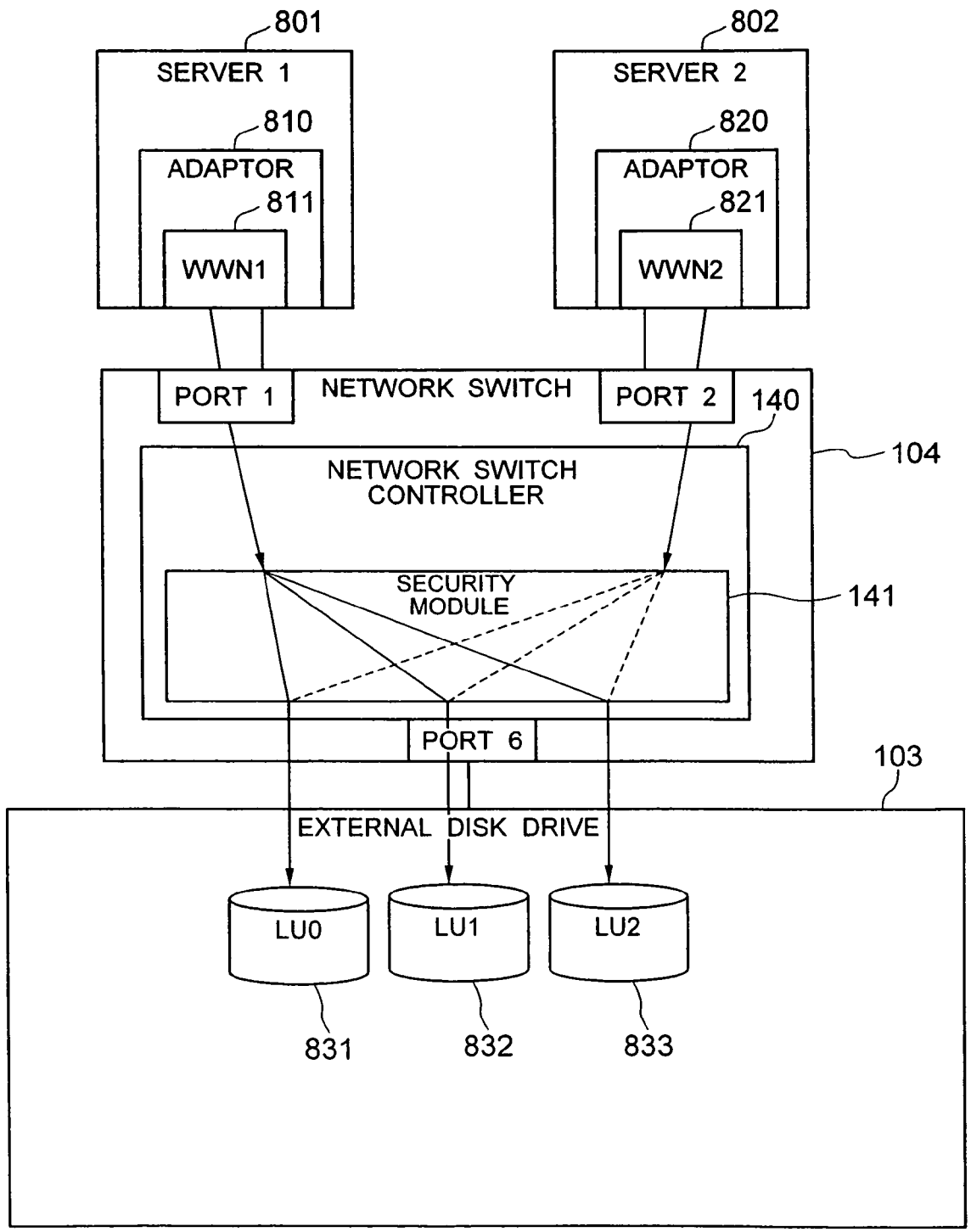
FIG. 15 shows an example of security setting of a network switch (embodiment 2).

FIG. 15 shows an example of changing the security setting in this embodiment. Here, the disk mapping module 131 in the external disk drive controller 130 is not used, and all disks of the external disk drive (831, 832, 833) are accessible. Where the security module 141 is not provided in the network switch 104, the disks 831, 832, 833 are accessible from both server 1 (801) and server 2 (802). If the security module 141 is so set that port 1 and port 6 of the network switch 104 belong to the same group, the external disk drive 103 connected to port 6 can be accessed by the server 1 (801) connected to the port 1 but an access to port 6 is not permitted from the server 2 (802) connected to port 2. This prevents the server 2 (802) from accessing the disks 831, 832, 833. The security setting of the security module 141 is changed to put port 2 and port 6 in the same group so that the disks 831, 832, 833 can be accessed from the server 2 (802).

FIG. 16 shows example information that is added to the server management table 303 of FIG. 4. Column 1601, column 1602 and column 1603 are added information. Column 1601 represents IDs of adaptors mounted on the servers shown in column 501. This is similar to column 502 in the disk mapping table shown in FIG. 5. Column 1602 represents connection destination network switch IDs that identify the network switch 104 to which the adaptor having the ID of column 1601 is connected. Column 1603 represents connection destination network switch port IDs that identify the position of a port of the network switch 104 to which the adaptor having the ID of column 502 is connected. Using this information, the failover module 110 can retrieve the network switch 104 and port position to which the server 102 is to be connected.

Figure 17:
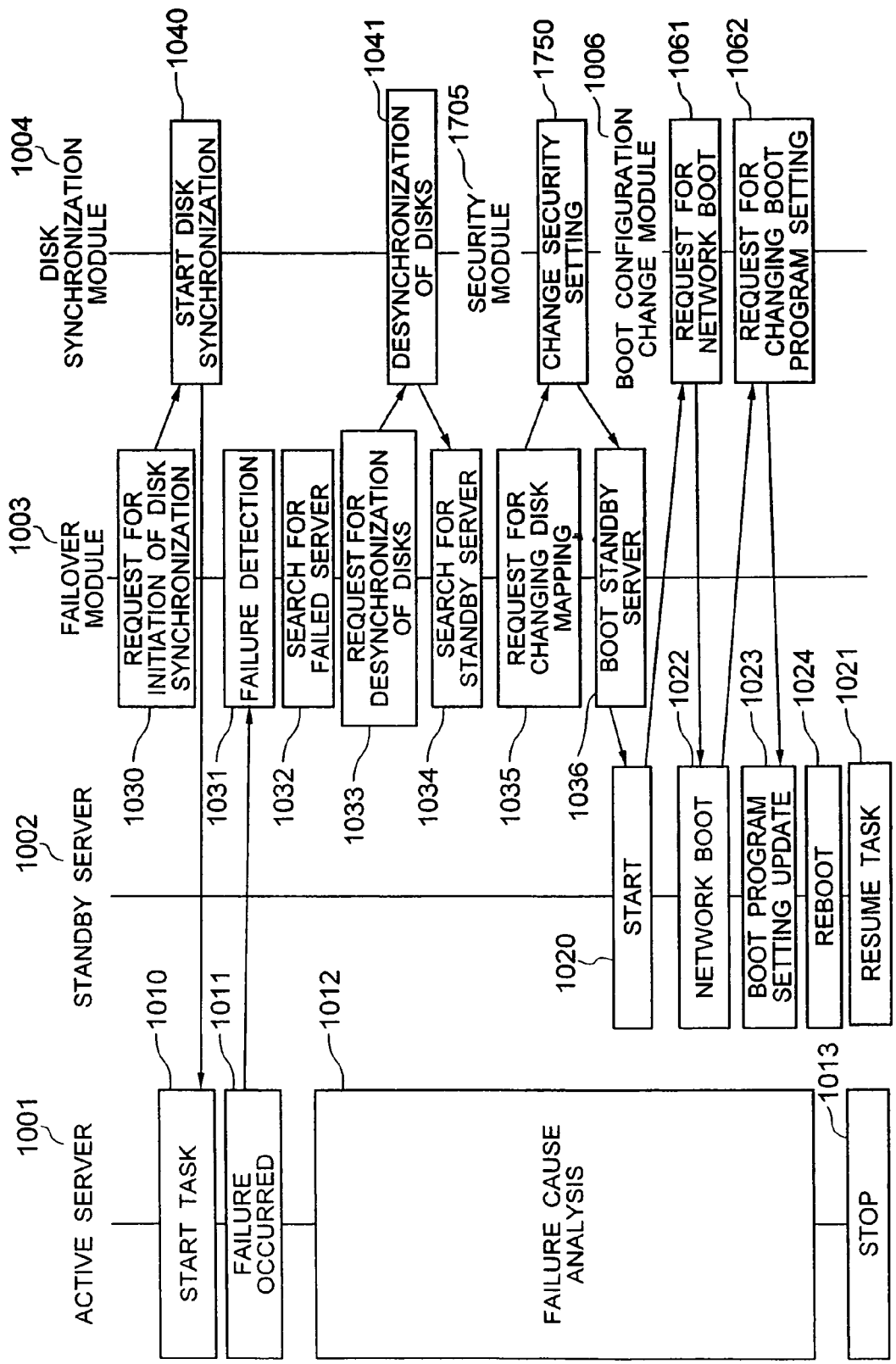
FIG. 17 shows a sequence diagram of this invention (embodiment 2).

FIG. 17 shows a sequence of steps performed in this embodiment. The sequence shows the operation of the active server 1001, standby server 1002, failover module 1003, disk synchronization module 1004, boot configuration change module 1006 and security module 1705. What is different from embodiment 1 is step 1750. In step 1750 the security setting of the security module 141 is changed to allow the standby server to access the standby disk 134 of the active server. The standby server therefore can boot by using the accessible standby disk 134.

Figure 18:
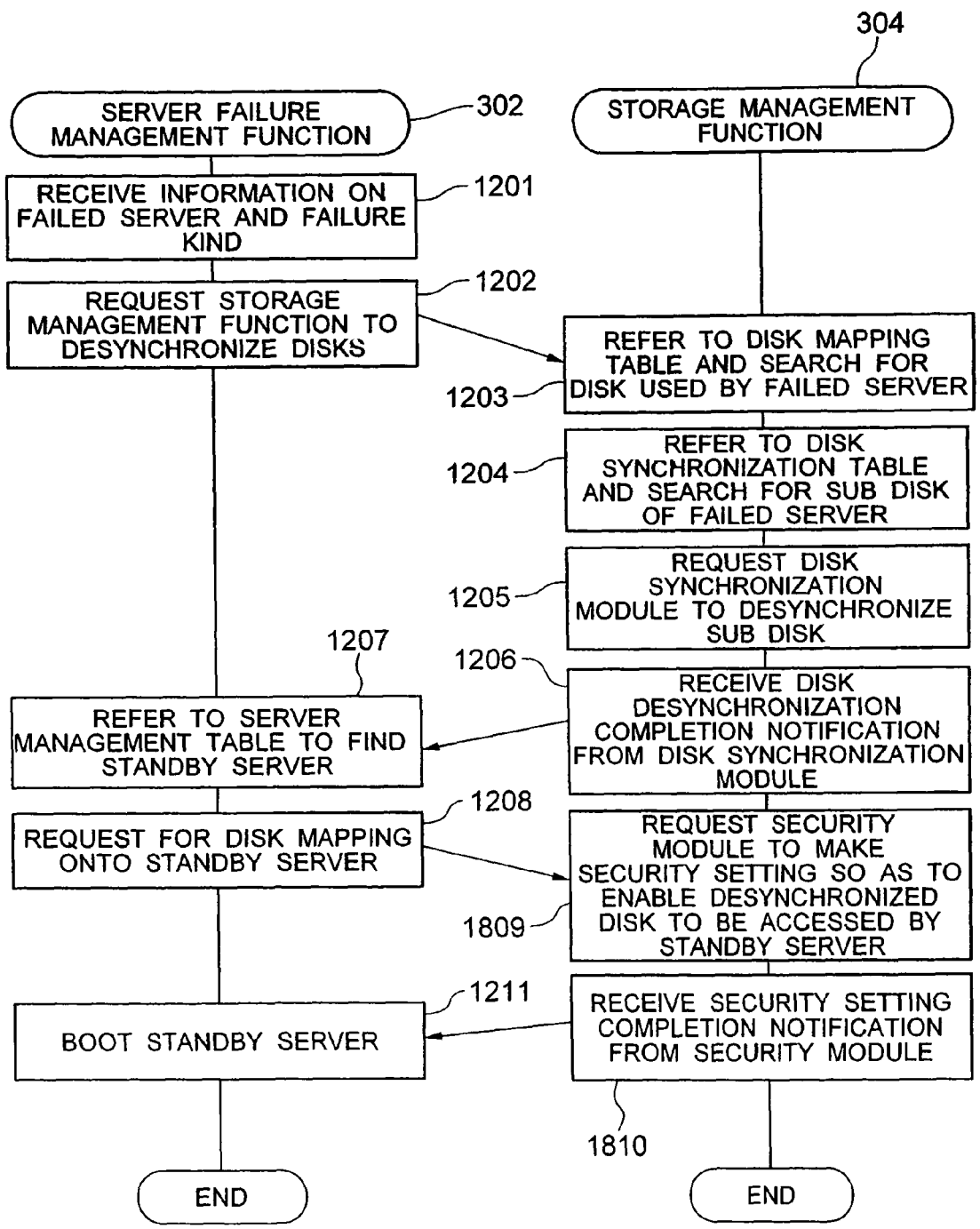
FIG. 18 shows a sequence diagram of a server failure detection function and a storage management function (embodiment 2).

FIG. 18 shows details of a sequence of steps performed by the server failure management function 302 and the storage management function 304 in this embodiment. What differs from embodiment 1 is step 1809 and step 1810. At step 1809 the storage management function 304 makes a request to the security module 141 to make accessible from the standby server the disk that the storage management function 304 desynchronized at step 1205. At step 1810 the storage management function 304 receives from the security module 141 a completion notification of the security setting change the storage management function 304 requested at step 1809. Now, the standby server can access the standby disk 134 of the active server.

Figure 19:
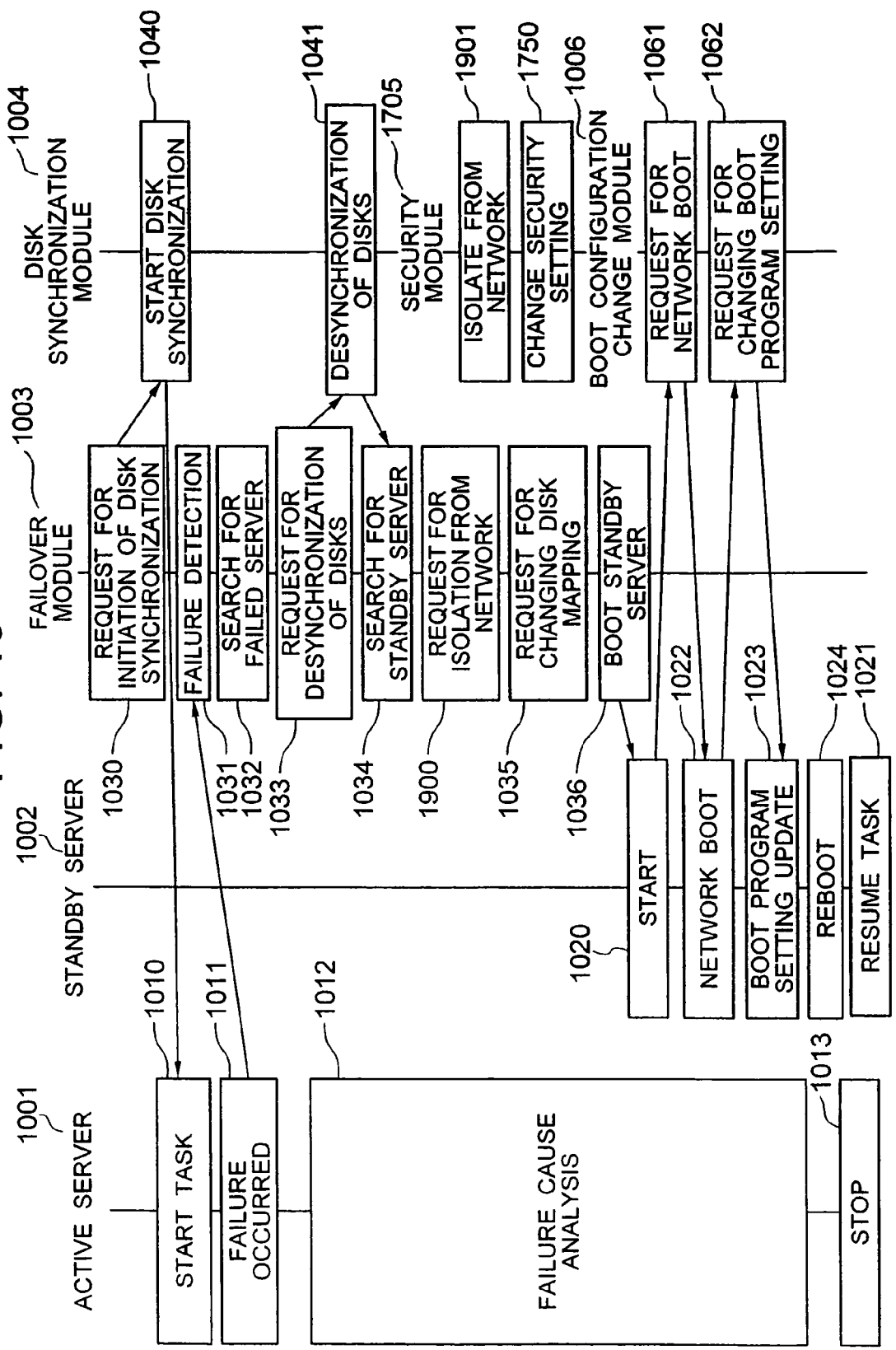
FIG. 19 shows a sequence diagram of this invention (embodiment 2).

FIG. 19 shows another sequence of steps performed in this embodiment. The sequence covers the active server 1001, standby server 1002, failover module 1003, disk synchronization module 1004, boot configuration change module 1006 and security module 1705. What differs from FIG. 17 is step 1900 and step 1901. At step 1900 the failover module 1003 requests the security module 141 to make unusable the port of the network switch 104 to which the NIC of the active server is connected, thereby isolating the active server from the network. At step 1901 the port of the network switch 104 to which the NIC of the active server 1001 is connected is made unusable. This blocks the flow of information output from the NIC of the active server 1001 to the network to avoid a possible contention of information such as IP addresses on the network between the active server and the standby server booted at step 1020. Another method of isolating the active server from the network involves changing the group ID of the port of the network switch 104 to which the NIC of the active server 1001 is connected to the one to which none of the ports of the network switch 104 belongs.

Embodiment 3

Unlike embodiment 1, embodiment 3 of this invention synchronizes the contents of the disk 133 and the standby disk 134 in the external disk drive 103 even if the disk synchronization module 132 is not provided in the external disk drive 103 of FIG. 1. In this embodiment the configuration of the server 102 of FIG. 2 differs from that of embodiment 1.

Figure 20:
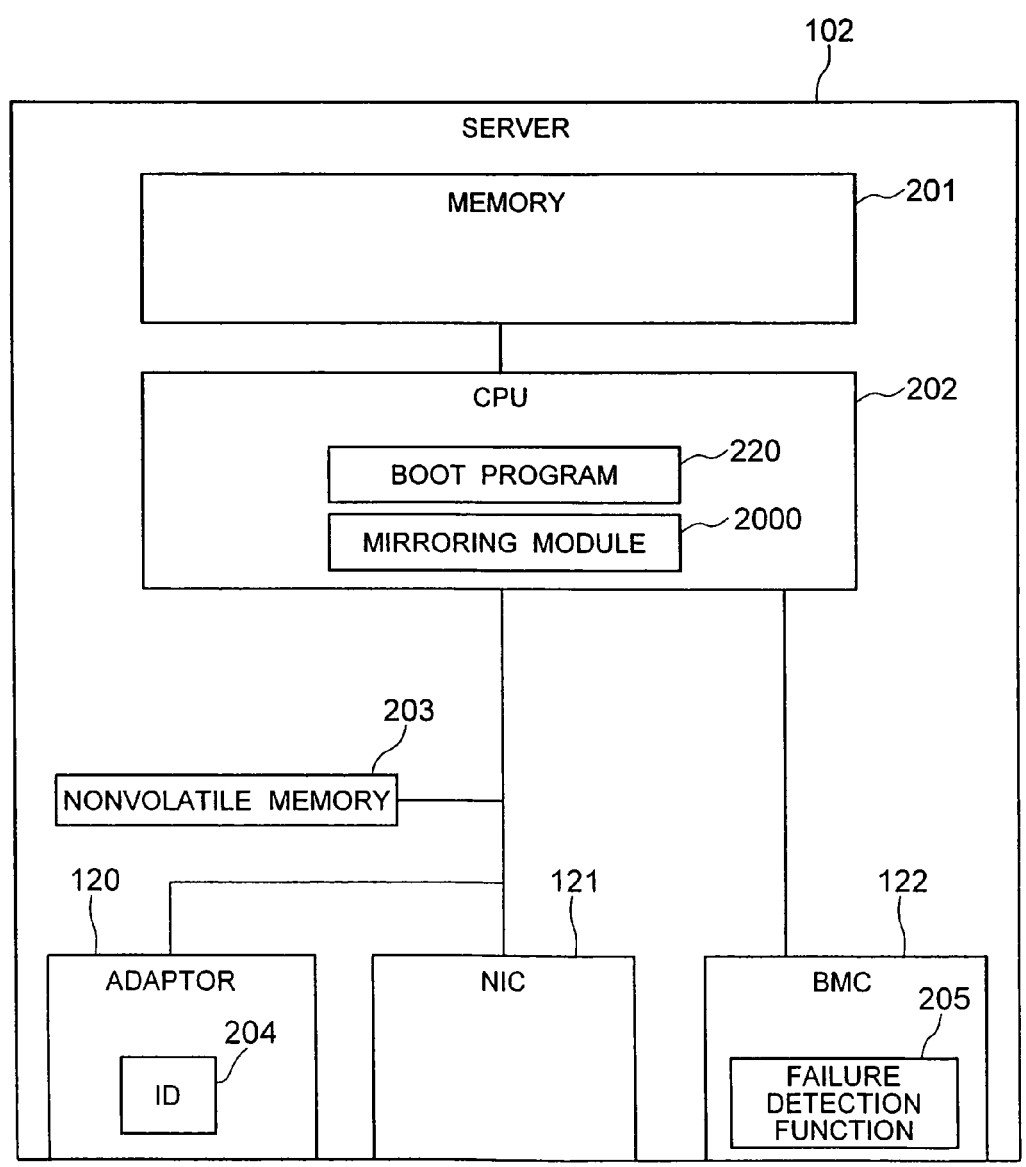
FIG. 20 shows a configuration diagram of a server (embodiment 3).

FIG. 20 shows details of the server 102 of this embodiment. What differs from FIG. 2 of embodiment 1 is that a mirroring module 2000 is provided. The mirroring module 2000 is a program executed by CPU 202 and has a function of presenting all information that the server 102 outputs to the disk 133 in the external disk drive 103 also to the standby disk 134 simultaneously.

Figure 21:
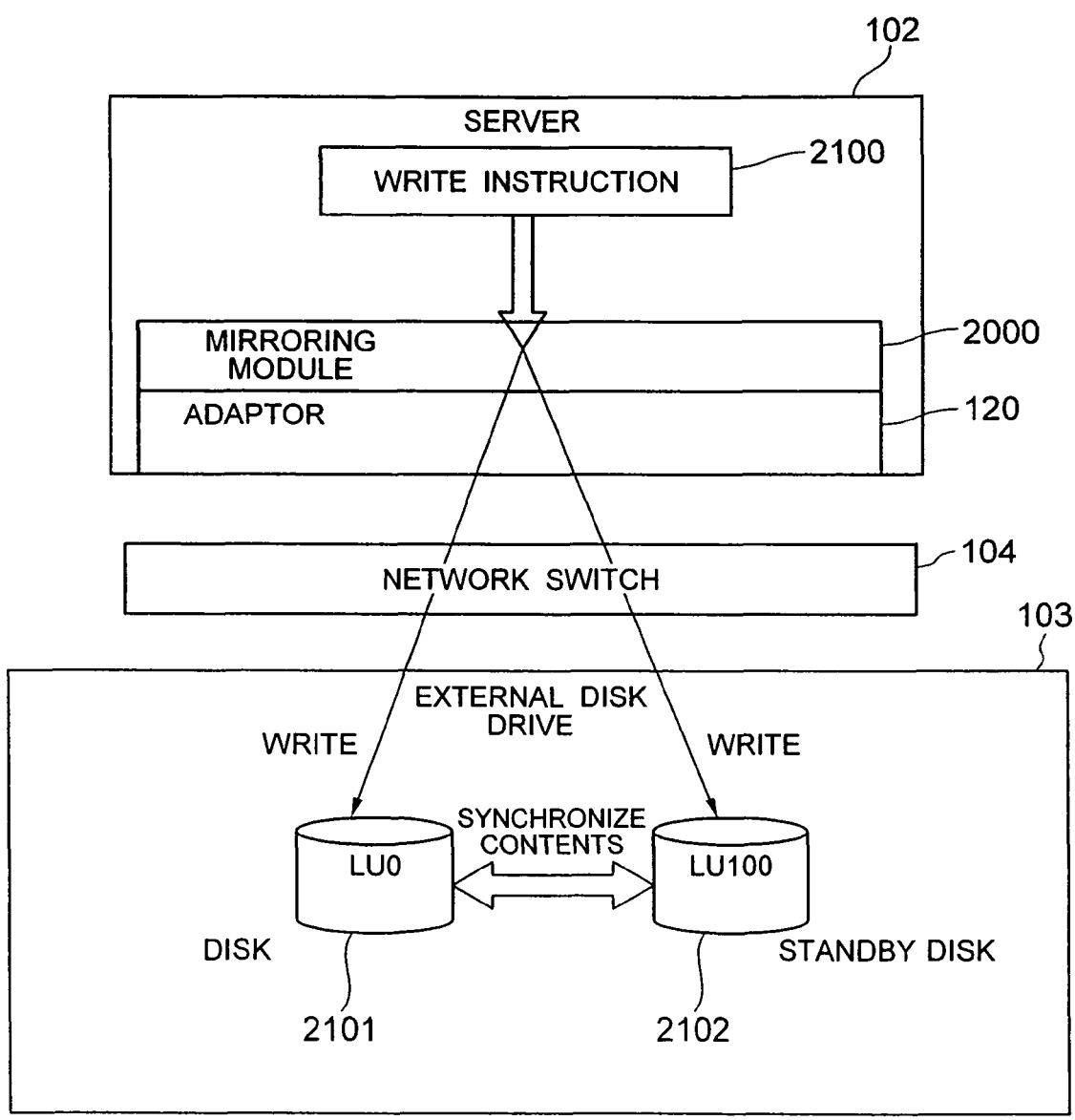
FIG. 21 shows an example configuration for synchronization by a mirroring module (embodiment 3).

FIG. 21 shows an example of disk synchronization by the mirroring module 2000 of this embodiment. A write instruction 2100 for the disk 2101 issued by the server 102 is converted by the mirroring module 2000 into processing that writes the same content into both the disk 2101 and the standby disk 2102 in the external disk drive 103. The content of the disk 2101 therefore can be synchronized with the content of the standby disk 2102. If the server 102 has a built-in disk, the mirroring module 2000 causes the same content to be written into the built-in disk and into the disk 2101 or standby disk 2102 in the external disk drive 103, thus synchronizing their contents.

Figure 22:
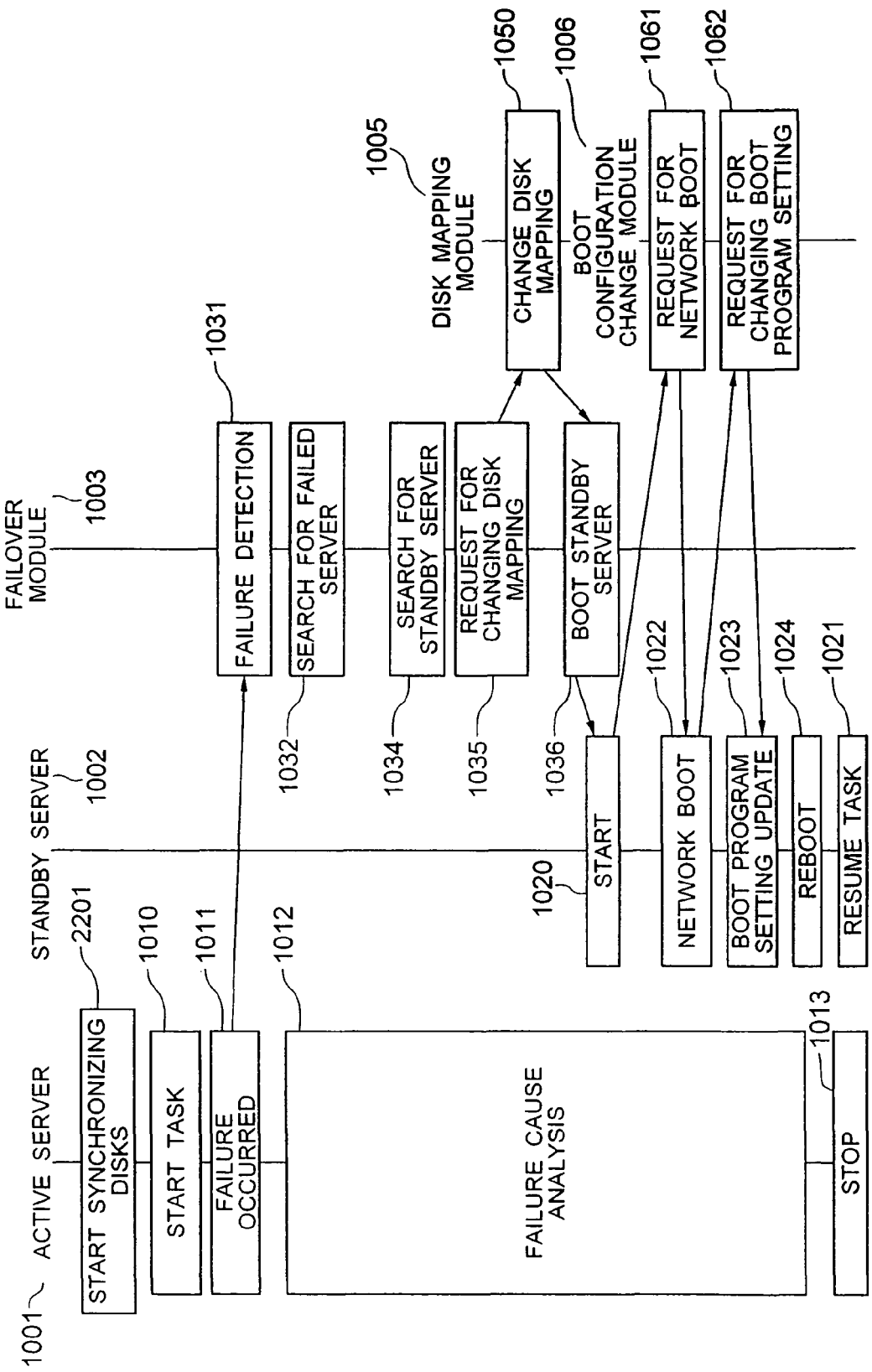
FIG. 22 shows a sequence diagram of this invention (embodiment 3).

FIG. 22 shows an operation sequence of this embodiment. The sequence covers the operation of the active server 1001, standby server 1002, failover module 1003, disk mapping module 1005 and boot configuration change module 1006. What differs from embodiment 1 is that step 2201 is added, that there is no sequence of operation for the disk synchronization module 1004, and that the step associated with the disk synchronization module 1004 is eliminated. Step 2201 shows that the mirroring module 2000 running on the server 102 begins synchronizing the contents of the disk 2101 and standby disk 2102 shown in FIG. 21. This allows for synchronization of contents among a plurality of disks even if there is no disk synchronization module 1004.

Figure 23:
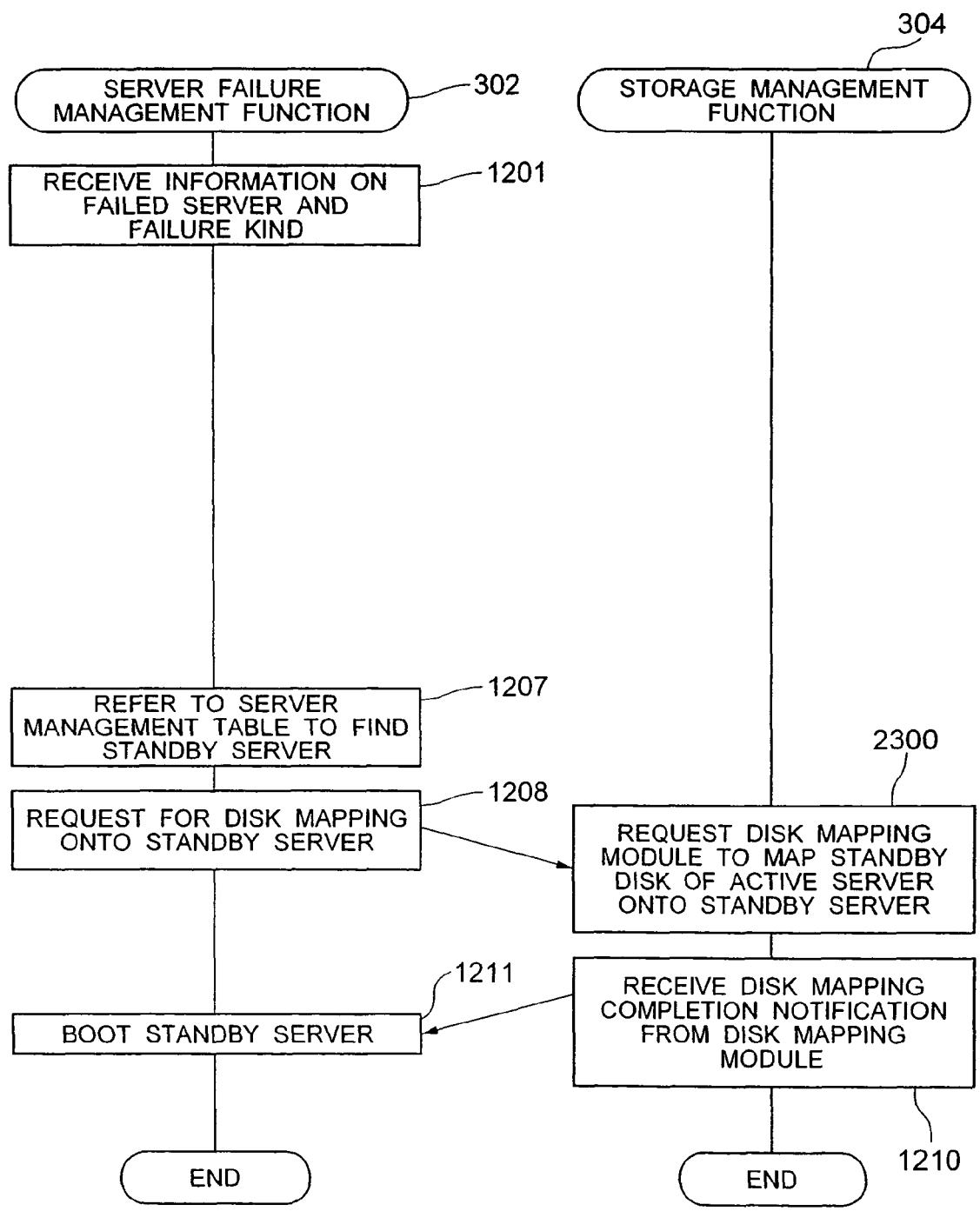
FIG. 23 shows a sequence diagram of a server failure management function and a storage management function (embodiment 3).

FIG. 23 shows details of a sequence of steps performed by the server failure management function 302 and the storage management function 304 in this embodiment. What differs from embodiment 1 is that the step 2300 and the step associated with the disk synchronization module are eliminated. At step 2300 the storage management function 304 requests the disk mapping module to map the standby disk 2102 of the active server of FIG. 21 onto the standby server.

Embodiment 4

Embodiment 4 of this invention presents a method by which the server 102 is provided with a local disk when the disk 133 of FIG. 1 shown in embodiment 1 does not exist. This embodiment assumes that the active server is operating by using a local disk.

Figure 24:
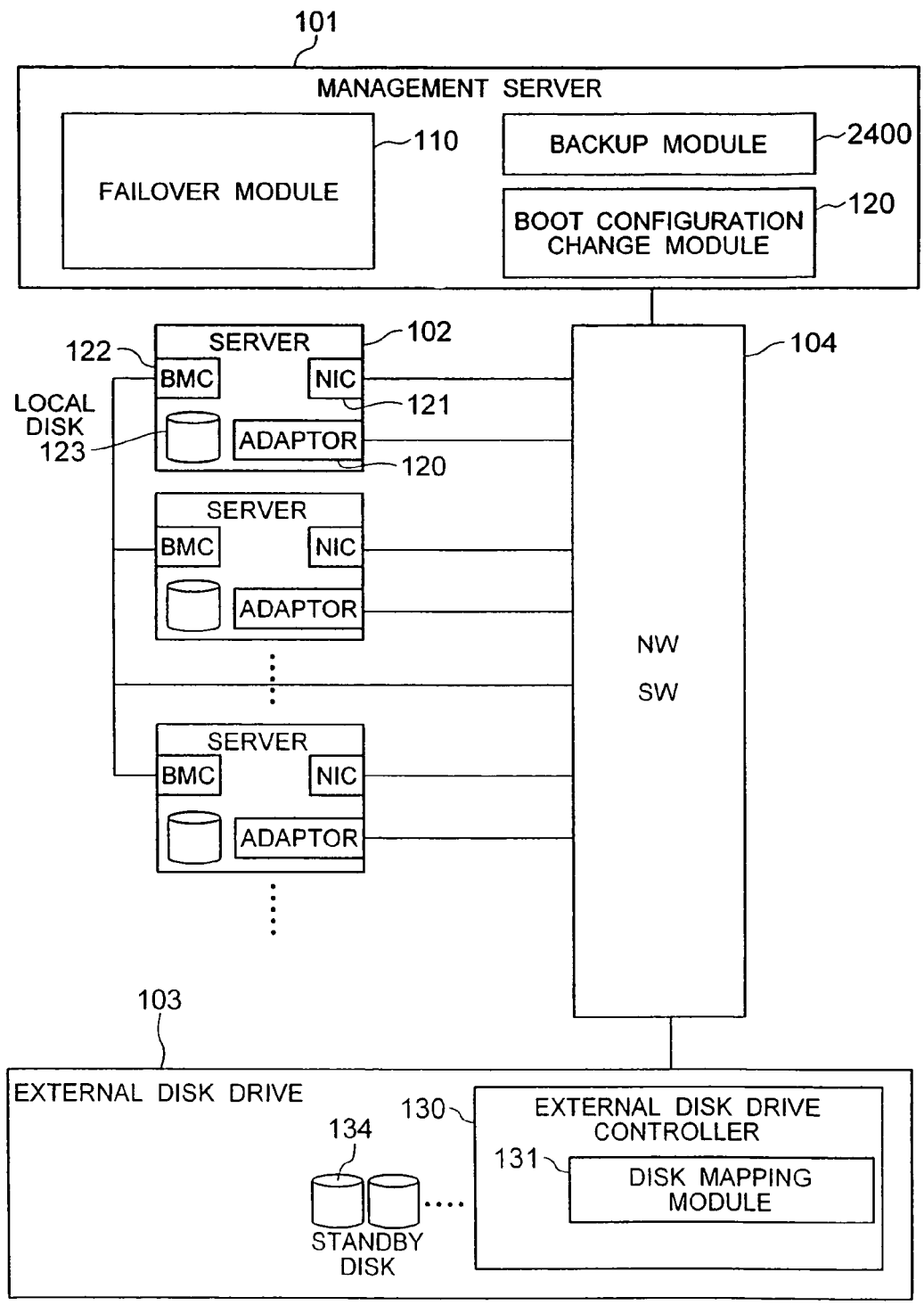
FIG. 24 shows an overall configuration of this invention (embodiment 4).

FIG. 24 shows an overall configuration of this embodiment. What differs from FIG. 1 of embodiment 1 is that the disk 133 and the disk synchronization module 132 are not provided in the external disk drive 103, that the server 102 has a local disk 123, and that the management server 101 has a backup module 2400. A server 102 that will act as a standby server does not need to have the local disk 123.

Figure 25:
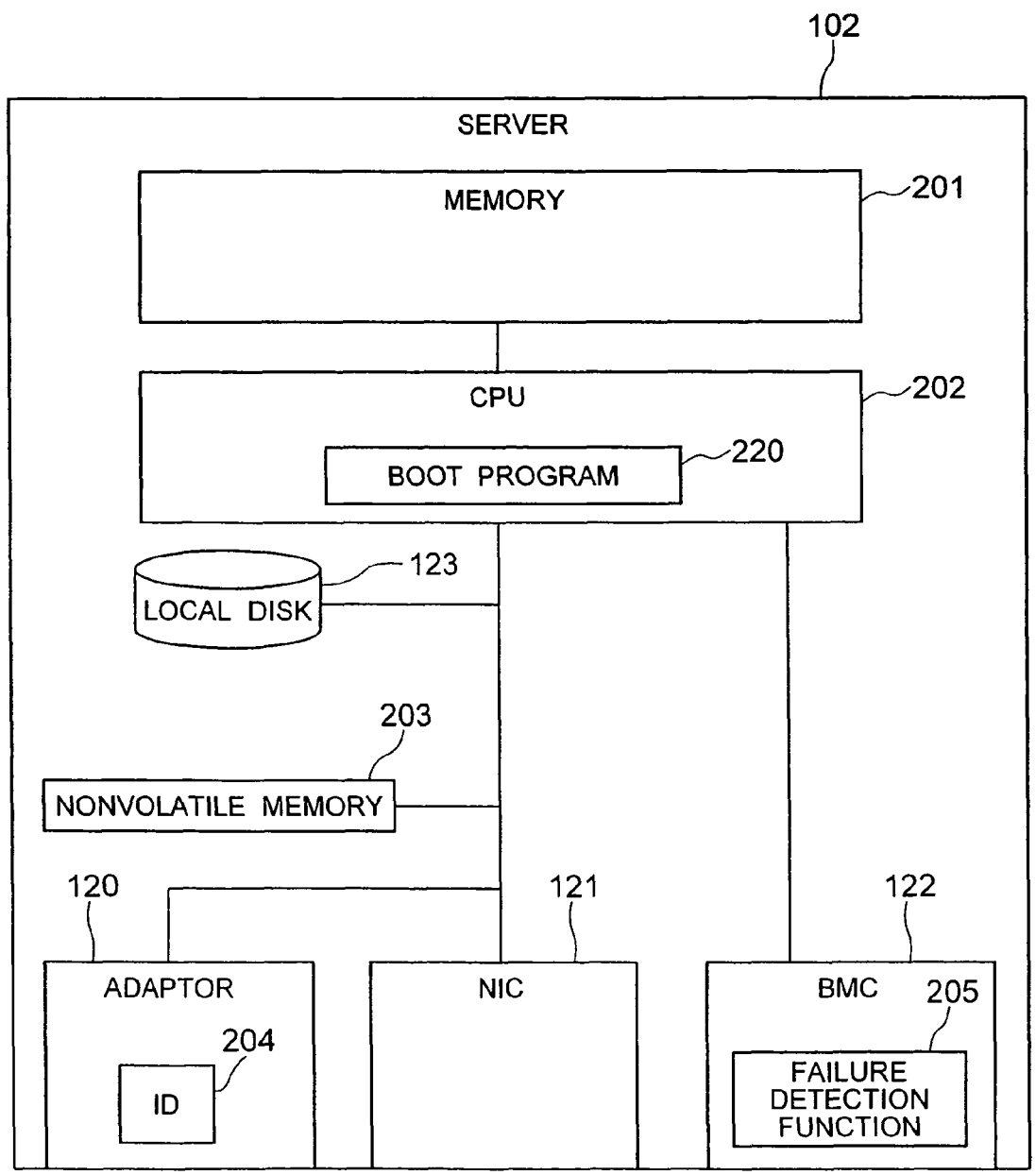
FIG. 25 shows a configuration of a server (embodiment 4).

FIG. 25 shows details of the server 102 in this embodiment. What differs from FIG. 2 of embodiment 1 is that the server has a local disk 123.

Figure 26:
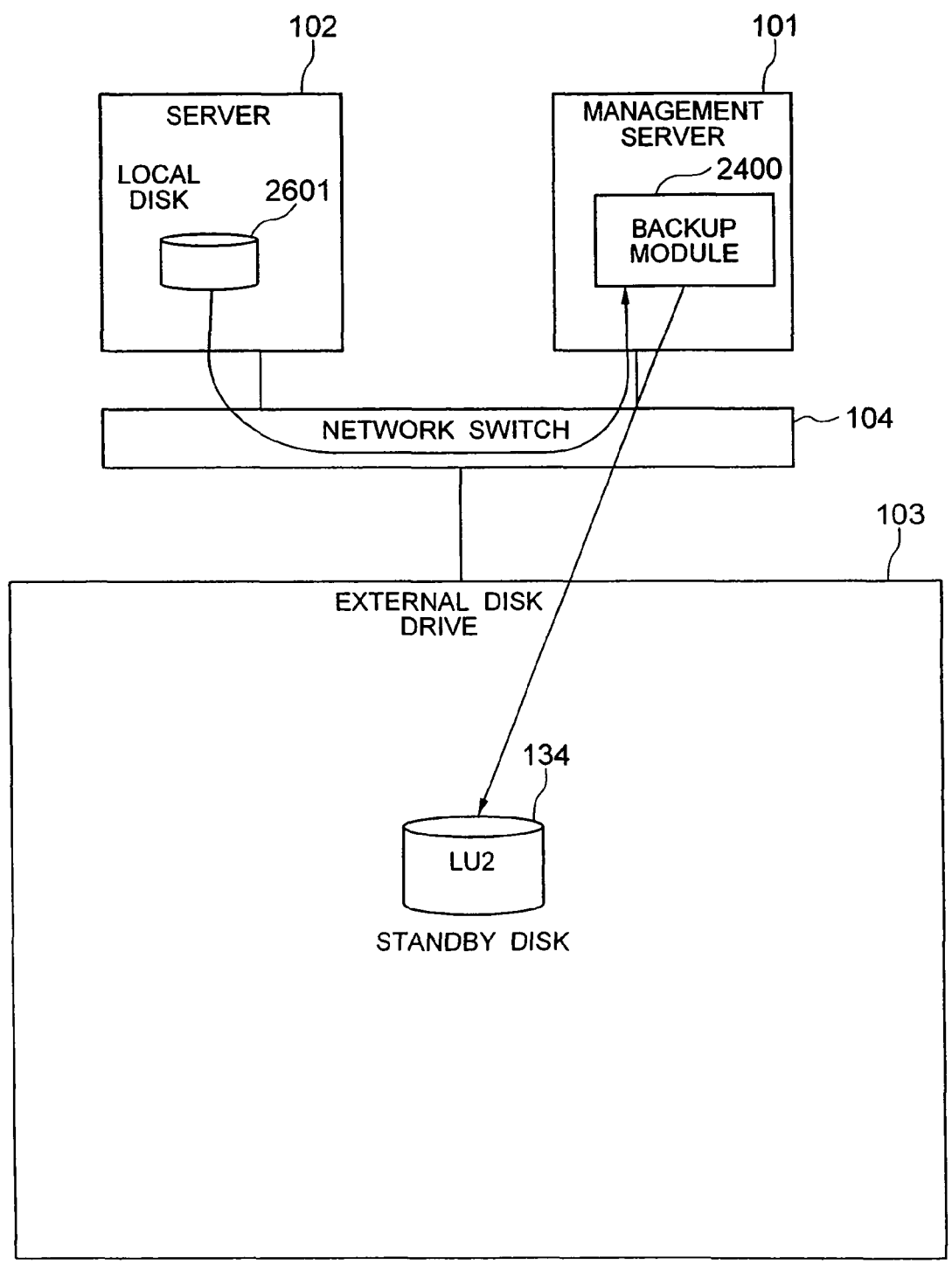
FIG. 26 shows an example configuration for backup by a backup module.
Figure 27:
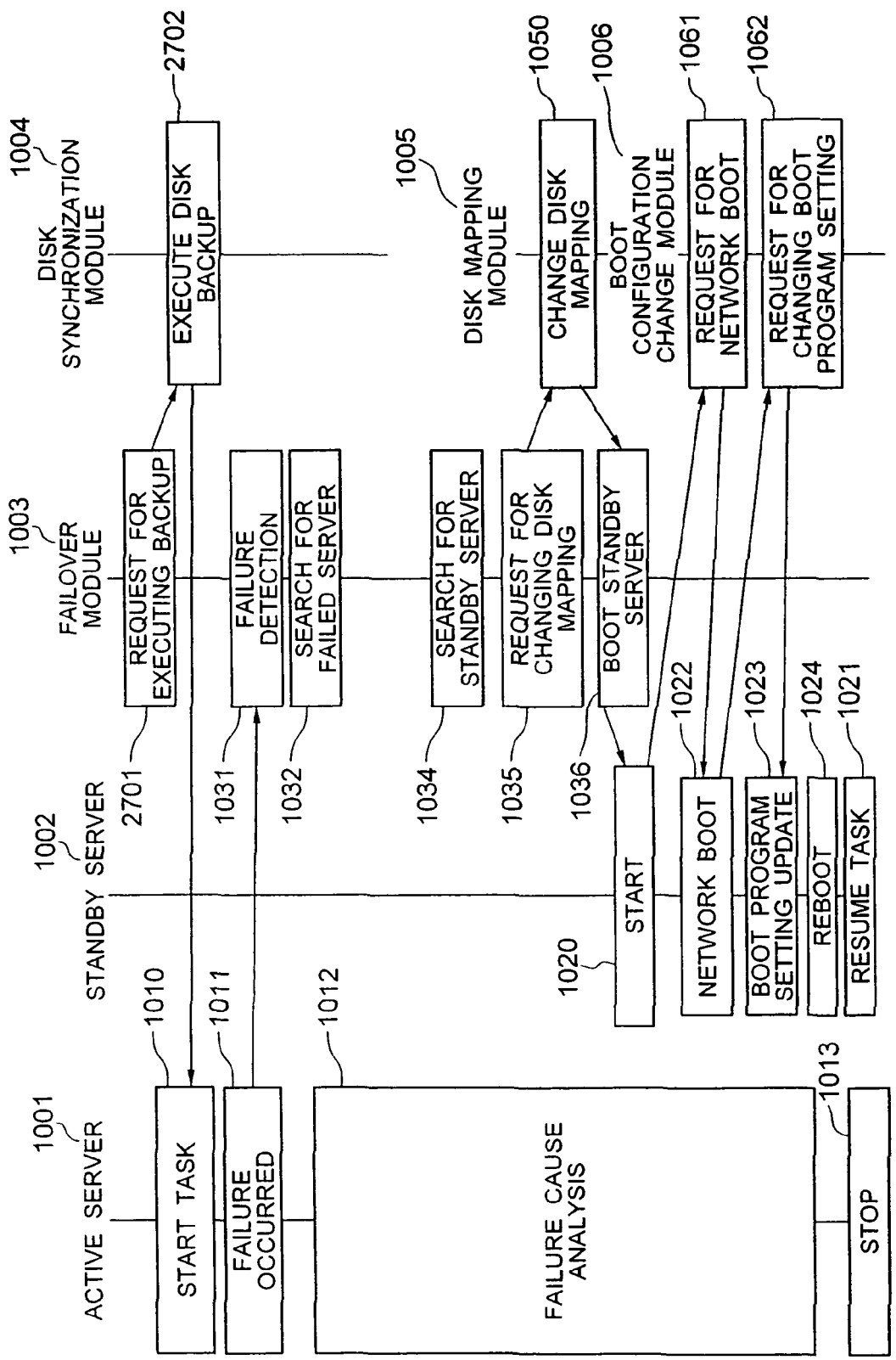
FIG. 27 shows a sequence diagram of this invention (embodiment 4).

FIG. 26 shows detailed operation of the backup module 2400 in this embodiment. The backup module 2400 reads the content of the local disk 123 of the server 102 via the network switch 104 and copies it to the standby disk 134 of the external disk drive 103. FIG. 27 shows a sequence of steps performed in this embodiment. The sequence shown covers the active server 1001, standby server 1002, failover module 1003, backup module 2700, disk mapping module 1005 and boot configuration change module 1006. What differs from embodiment 1 is that the step 1033 is eliminated and that the backup module 2700, step 2701 and step 2702 are added. At step 2701 the failover module 1003 requests the backup module 2700 to back up the content of the local disk 123 of the active server 1001 to the standby disk of the external disk drive. At step 2702 the backup module 2700, upon receiving the backup request from the failover module 1003, copies the content of the local disk of the active server 1001 to the standby disk of the external disk drive.

Figure 28:
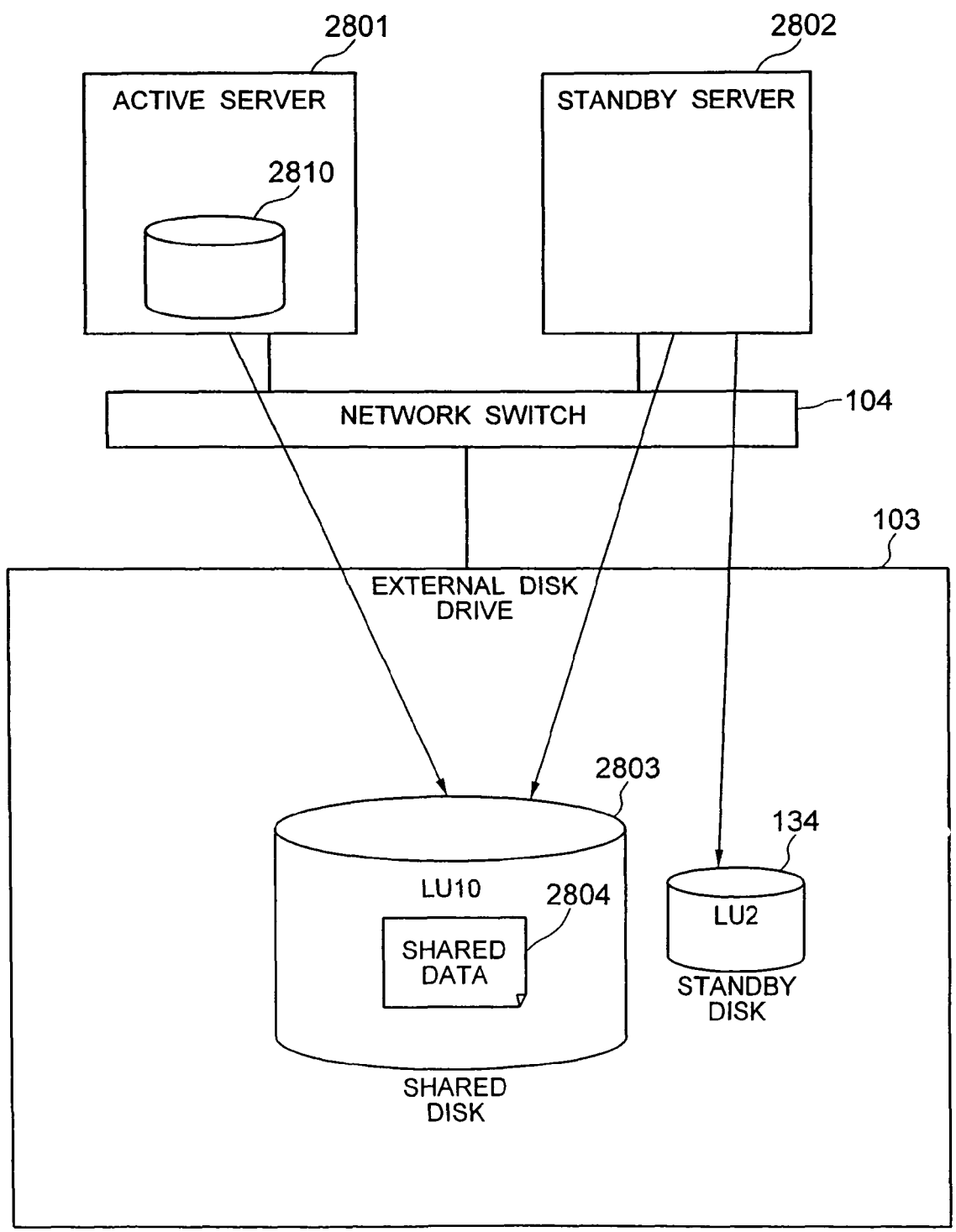
FIG. 28 shows an example configuration for sharing a disk (embodiment 4).

FIG. 28 shows an example configuration of servers and disks of the external disk drive in this embodiment. In FIG. 28, the active server 2801 and the standby server 2802 share a common disk 2803. The common disk 2803 is written with shared data 2804, such as setting data of applications running on the active servers 2801 and logs. This ensures that even if the content of the standby disk 134 used by the standby server 2802 for booting fails to match the content of the local disk 2810 of the active server 2801, the standby server 2802 can boot with the settings of the applications matching those of the active server 2801.

Embodiment 5

Embodiment 5 of this invention presents a method in which the disk synchronization shown in embodiment 1 is not executed at any time.

Figure 29:
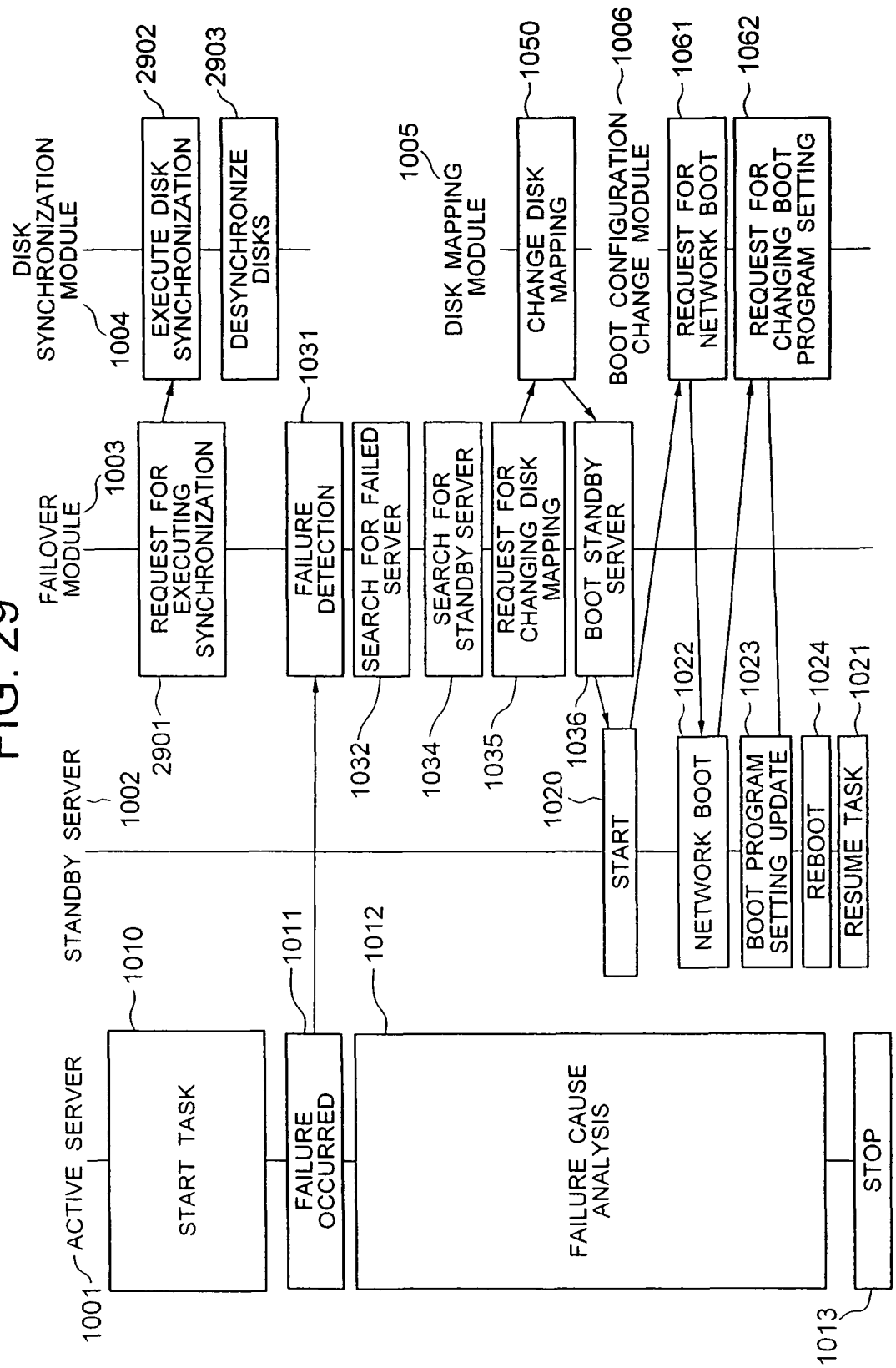
FIG. 29 shows a sequence diagram of this invention (embodiment 5).

FIG. 29 shows a sequence of steps performed in this embodiment. The sequence shown covers the active server 1001, standby server 1002, failover module 1003, disk synchronization module 1004, disk mapping module 1005 and boot configuration change module 1006. What differs from embodiment 1 is that the step 1033 is eliminated and that step 2901, step 2902 and step 2903 are added. At step 2901 the failover module 1003 requests the disk synchronization module 1004 to synchronize the content of the standby disk of the external disk drive with that of the disk used by the active server 1001. At step 2902 the disk synchronization module 1004 synchronizes the content of the standby disk of the external disk drive with the content of the disk used by the active server 1001. At step 2903, when the disk contents agree at step 2902, the disks are desynchronized. As a result, if a failure occurs with the active server 1001 at a subsequent step 1011 and the content of the disk used by the active server 1001 is destroyed, the content of the standby disk used by the standby server 1002 is kept from being destroyed.

Embodiment 6

Embodiment 6 of this invention is an example case of changing the disk from which to boot one server to another disk, rather than transferring the server to another as in embodiment 4. In embodiment 4, the occurrence of a failure in the server triggers the process of changing the boot configuration of the server. In this embodiment any other trigger may be used to change the server boot configuration. This embodiment therefore does not need to provide the failover module 110 with the server failure detection function 301 as in embodiment 4. Although this embodiment changes the configuration that boots the server from the built-in disk to one which boots the server from an external disk drive, it is also possible to change the configuration from booting the server from the external disk drive to booting from the built-in disk.

Figure 30:
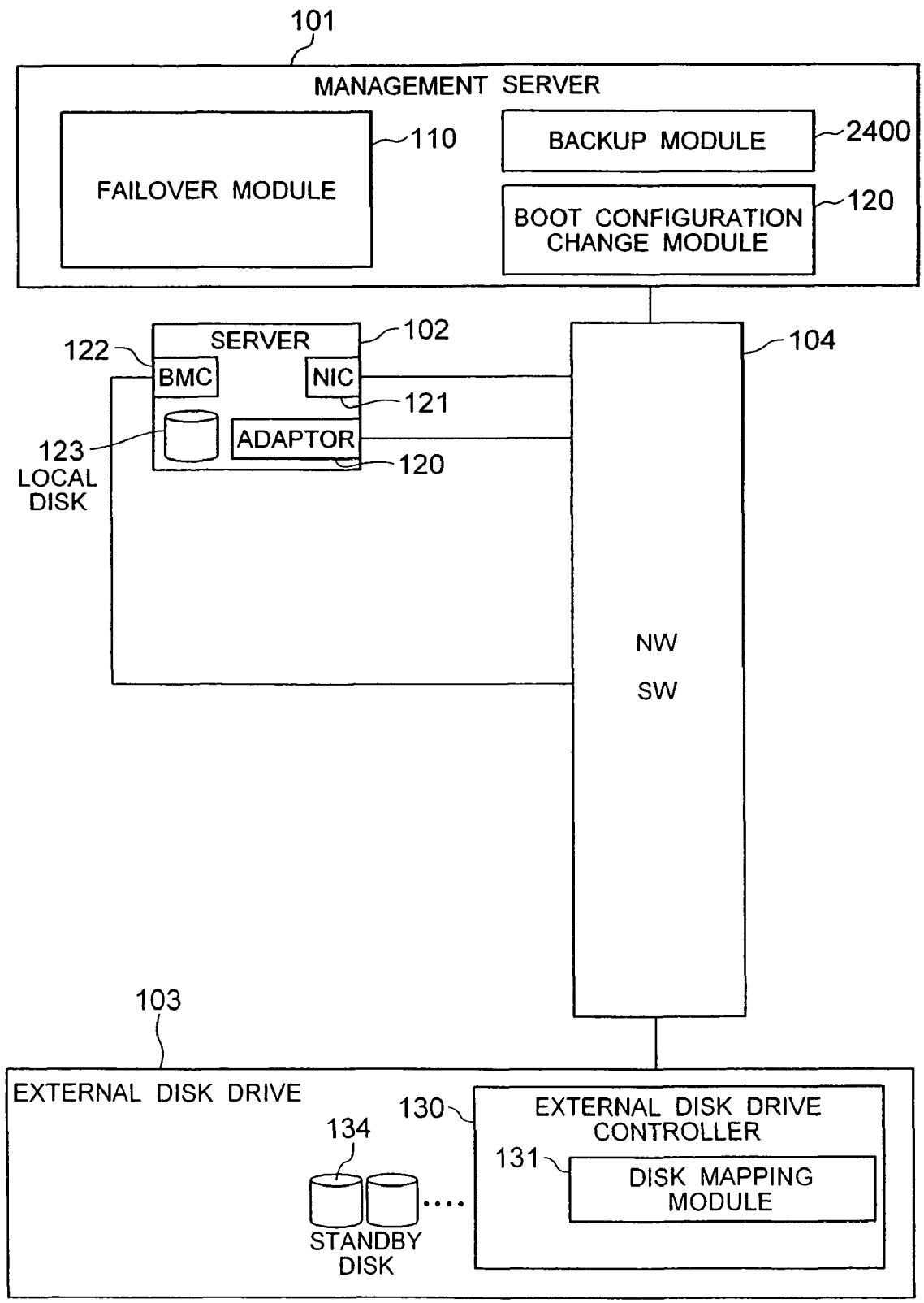
FIG. 30 shows an entire configuration of this invention (embodiment 6).

FIG. 30 shows an overall configuration of another embodiment of this invention. What differs from FIG. 24 of embodiment 4 is that the system of this embodiment has only one server 102. It is noted, however, that two or more servers may also be used.

FIG. 31 shows a sequence of steps performed in this embodiment. What differs from FIG. 27 of embodiment 4 is that there is no standby server, that steps associated with an active server are changed, and that the process of changing the server boot configuration is triggered not by an occurrence of failure but by the initiation of step 3101. At step 3102 the failover module 1003 boots the active server 1001. At step 3103 the active server boots and at step 3104 a network boot is initiated. Step 3105 executes the updating of the active server boot program. Step 3106 reboots the active server. At step 3107 the active server boots using a standby disk to resume its service. In this embodiment, if the network boot function 307 is not provided, it does not pose any problem as long as the agent 370 is installed in the disk 123 of the active server. The active server need only start the agent 370 by using step 3101 as a trigger to execute the sequence beginning with step 3105.

FIG. 32 shows a detailed sequence of steps performed by the server failure management function 302 and the storage management function 304 of the failover module 110 in this embodiment. At step 3201 the server failure management function 302 receives a boot configuration change request. This request may be made either manually by the computer system administrator or automatically by other software. At step 3202 the server failure management function 302 requests the storage management function 304 to map the standby disk onto the active server. At step 3203 the storage management function 304 requests the disk mapping module to map the standby disk onto the active server. At step 3204 the storage management function 304 receives a completion notification of the disk mapping request of step 3203 from the disk mapping module. At step 3205 the server failure management function 302 boots the active server.

FIG. 33 shows details of a sequence of steps performed by the network boot function 307, boot management function 308 and agent 370. What differs from the sequence of embodiment 2 shown in FIG. 35 is that the standby server is changed to the active server and that step 3316 is added. At step 3316 the boot management function 308 retrieves from the boot configuration table information on a boot device of the standby disk in the active server. For example, when the boot device for the active server is changed from IDE to SAN, the boot device in column 5102 of FIG. 34 is changed from IDE to SAN.

In this embodiment if the disk mapping module 131 is not provided, the security module 141 of FIG. 13 may be used instead just as embodiment 2 uses the security module in place of the disk mapping function of embodiment 1. Further, if the backup module 2400 of this embodiment is not provided, the mirroring module 2000 of embodiment 3 shown in FIG. 20 may be used instead.

The boot configuration changing method of this invention can be used as a means for transferring a task actively being executed by a server to another server. Further, this method allows one server to execute a task while at the same time allowing another server to update and replace software and hardware and to perform their tests.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A boot configuration changing method executed by a management server in a computer system in which the management server and a plurality of servers are connected to an external disk drive via a network switch and in which each server can be made operational by booting an operating system from the external disk drive, the boot configuration changing method comprising:
    requesting initiation of synchronization processing between a first disk and a second disk of the external disk drive with respect to a first content of the first disk that is used for booting a first server of the plurality of servers;
    changing a setting of a boot program of a second server of the plurality of servers so that the second server is booted from the second disk; and
    changing a second content of the second disk so that software installed in the second disk is booted from the second disk.

2. The boot configuration changing method according to claim 1, wherein, upon initiation of the synchronization processing being requested, the external disk drive writes information that is to be written into the first disk into the first disk and the second disk to thereby synchronize the contents of the first and second disks.

3. The boot configuration changing method according to claim 1, wherein changing the setting of the boot program of the second server comprises booting the second server and transmitting an agent to the second server through a network boot, and wherein the second server boots the agent to cause a change in the setting of the boot program of the second server.

4. The boot configuration changing method according to claim 1, wherein changing the second content of the second disk comprises booting the second server and transmitting an agent to the second server through a network boot, and wherein the second server boots the agent to cause a change in a boot loader setting and a mount setting.

5. The boot configuration changing method according to claim 1, wherein the network switch includes a security module which controls permission and rejection of access of the external disk drive by the second disk using identification information of the second server, and wherein the management server transmits a request to the external disk drive to allow the second server to access the second disk.

6. A computer system, comprising:
an external disk drive;
a management server connected to the external disk drive via a network switch; and
a plurality of servers connected to the external disk drive via the network switch, each server of the plurality of servers being configured to be made operational by booting an operating system from the external disk drive, and
wherein the management server is configured to request initiation of synchronization processing between a first disk and a second disk of the external disk drive with respect to a first content of the first disk that is used for booting a first server of the plurality of servers, and
wherein the management server is configured to direct a first change in a setting of a boot program of a second server of the plurality of servers so that the second server is booted from the second disk, and direct a second change in a second content of the second disk so that software installed in the second disk is booted from the second disk.

7. The computer system according to claim 6, wherein, upon initiation of the synchronization processing being requested by the management server, the external disk drive writes information that is to be written into the first disk into the first disk and the second disk to thereby synchronize the contents of the first and second disks.

8. The computer system according to claim 6, wherein the management server directs the first change in the setting of the boot program of the second server by booting the second server and transmitting an agent to the second server through a network boot, and wherein the second server boots the agent to cause the setting of the boot program of the second server to change.

9. The computer system according to claim 6, wherein the management server directs the second change in the second content of the second disk by booting the second server and transmitting an agent to the second server through a network boot, and wherein the second server boots the agent to cause a boot loader setting and a mount setting to change.

10. The computer system according to claim 6, wherein the network switch includes a security module which controls permission and rejection of access of the external disk drive by the second disk using identification information of the second server, and wherein the management server transmits a request to the external disk drive to allow the second server to access the second disk.

11. A management server, comprising:
a processor; and
a memory storing computer readable instructions for execution by the processor to perform a boot configuration changing method for a computer system in which the management server and a plurality of servers are connected to an external disk drive via a network switch and in which each server can be made operational by booting an operating system from the external disk drive, and
wherein the boot configuration changing method comprises:

requesting initiation of synchronization processing between a first disk and a second disk of the external disk drive with respect to a first content of the first disk that is used for booting a first server of the plurality of servers;
changing a setting of a boot program of a second server of the plurality of servers so that the second server is booted from the second disk; and
changing a second content of the second disk so that software installed in the second disk is booted from the second disk.

12. The management server according to claim 11, wherein, upon initiation of the synchronization processing being requested, the external disk drive writes information that is to be written into the first disk into the first disk and the second disk to thereby synchronize the contents of the first and second disks.

13. The management server according to claim 11, wherein changing the setting of the boot program of the second server comprises booting the second server and transmitting an agent to the second server through a network boot, and wherein the second server boots the agent to cause a change in the setting of the boot program of the second server.

14. The management server according to claim 11, wherein changing the second content of the second disk comprises booting the second server and transmitting an agent to the second server through a network boot, and wherein the second server boots the agent to cause a change in a boot loader setting and a mount setting.

15. The management server according to claim 11, wherein the network switch includes a security module which controls permission and rejection of access of the external disk drive by the second disk using identification information of the second server, and wherein the management server transmits a request to the external disk drive to allow the second server to access the second disk.

16. A non-transitory computer-readable medium having computer readable instructions stored thereon for execution by a processor of a management server to perform a boot configuration changing method for a computer system in which the management server and a plurality of servers are connected to an external disk drive via a network switch and in which each server can be made operational by booting an operating system from the external disk drive, the boot configuration changing method comprising:
requesting initiation of synchronization processing between a first disk and a second disk of the external disk drive with respect to a first content of the first disk that is used for booting a first server of the plurality of servers;
changing a setting of a boot program of a second server of the plurality of servers, so that the second server is booted from the second disk; and
changing a second content of the second disk so that software installed in the second disk is booted from the second disk.

17. The computer-readable medium according to claim 16, wherein, upon initiation of the synchronization processing being requested, the external disk drive writes information that is to be written into the first disk into the first disk and the second disk to thereby synchronize the contents of the first and second disks.

18. The computer-readable medium according to claim 16, wherein changing the setting of the boot program of the second server comprises booting the second server and transmitting an agent to the second server through a network boot, and wherein the second server boots the agent to cause a change in the setting of the boot program of the second server.

19. The computer-readable medium according to claim 16, wherein changing the second content of the second disk comprises booting the second server and transmitting an agent to the second server through a network boot, and wherein the second server boots the agent to cause a change in a boot loader setting and a mount setting.

20. The computer-readable medium according to claim 16, wherein the network switch includes a security module which controls permission and rejection of access of the external disk drive by the second disk using identification information of the second server, and wherein the management server transmits a request to the external disk drive to allow the second server to access the second disk.

* * * * *